(12) United States Patent
Duvvuri

(10) Patent No.: US 12,284,262 B2
(45) Date of Patent: Apr. 22, 2025

(54) SYSTEM AND TECHNIQUES TO AUTOCOMPLETE A NEW PROTOCOL DEFINITION

(71) Applicant: Oracle International Corporation, Redwood Shores, CA (US)

(72) Inventor: Venkata Chandrashekar Duvvuri, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/586,764

(22) Filed: Jan. 27, 2022

(65) Prior Publication Data

US 2023/0239377 A1    Jul. 27, 2023

(51) Int. Cl.
| | |
|---|---|
| *G06Q 30/00* | (2023.01) |
| *G06F 18/22* | (2023.01) |
| *G06N 20/00* | (2019.01) |
| *G06Q 30/0251* | (2023.01) |
| *H04L 69/00* | (2022.01) |
| *H04L 69/08* | (2022.01) |
| *H04L 69/18* | (2022.01) |

(52) U.S. Cl.
CPC .............. *H04L 69/18* (2013.01); *G06F 18/22* (2023.01); *G06N 20/00* (2019.01); *G06Q 30/0251* (2013.01); *H04L 69/03* (2013.01); *H04L 69/08* (2013.01)

(58) Field of Classification Search
None
See application file for complete search history.

(56) References Cited

U.S. PATENT DOCUMENTS

| | | |
|---|---|---|
| 9,430,775 B2 | 8/2016 | Dudyala |
| 10,671,410 B1 | 6/2020 | Sutton et al. |
| | (Continued) | |

OTHER PUBLICATIONS

Fontanella, Clint, 20 Customer Touchpoints That Will Optimize Your Customer Journey, Jun. 15, 2021, https://blog.hubspot.com/service/customer-touchpoints (Year: 2021).*

(Continued)

*Primary Examiner* — Michael W Schmucker
(74) *Attorney, Agent, or Firm* — MUGHAL GAUDRY & FRANKLIN PC

(57) ABSTRACT

Various techniques can include accessing a master tree that was generated using a plurality of protocol definitions. The plurality of protocol definitions can identifies an ordered set of actions and specifies, for each sequential pair of actions in the ordered set of actions, an action-advancement condition that identifies a criterion for advancing across the sequential pair of actions in the ordered set of actions so as to trigger a later of the sequential pair of actions. A master tree includes a set of dynamic nodes and a set of static nodes. The technique can include accessing a partial protocol definition that includes at least one action. The technique can include generating an auto-completion of the partial protocol definition using the master tree, at least some of the dynamic-node weights, and at least some of the static-node weights. The technique can output a representation of an auto-completed protocol definition.

20 Claims, 15 Drawing Sheets

(56) References Cited

U.S. PATENT DOCUMENTS

2017/0061338 A1* 3/2017 Mack ................. G06Q 10/0637
2020/0160377 A1* 5/2020 Bodin ....................... G06F 8/33

OTHER PUBLICATIONS

"Oracle Responsys Campain Management" Oracle, retrieved on Jan. 31, 2022, https://www.oracle.com/cx/marketing/campaign-management/, 4 pages.
"Oracle University Training", Oracle Responsys Help Center, retrieved on Jan. 31, 2022 from: https://docs.oracle.com/en/cloud/saas/marketing/responsys-user/university.htm, 1 page.
"Understanding Program", Oracle Responsys Help Center, retrieved on Jan. 31, 2022, from: https://docs.oracle.com/en/cloud/saas/marketing/responsys-user/Programs_Overview.htm, 10 pages.

* cited by examiner

SYSTEM AND TECHNIQUES TO AUTOCOMPLETE A NEW PROTOCOL DEFINITION

BACKGROUND

Tools for designing protocol definition graphs or workflows do not currently leverage information from stored protocol definitions. Therefore, the lessons learned from previous protocol designs are not readily incorporated into new protocol definitions.

SUMMARY

In some aspects, a computer-implemented method includes: accessing a master tree that was generated using a plurality of protocol definitions, wherein: each of the plurality of protocol definitions identifies an ordered set of actions and specifies, for each sequential pair of actions in the ordered set of actions, an action-advancement condition that identifies a criterion for advancing across the sequential pair of actions in the ordered set of actions so as to trigger a later of the sequential pair of actions; the master tree includes a set of dynamic nodes and a set of static nodes; each of the set of dynamic nodes represents an action that was identified in at least one of the plurality of protocol definitions; each of the set of static nodes represents an action-advancement condition specified in one or more of the plurality of protocol definitions; the master tree is configured such that, for each of the plurality of protocol definitions, a path through a subset of set of static nodes and through a subset of the set of dynamic nodes represents the protocol definition; each of the set of dynamic nodes has a dynamic-node weight that was defined based on data indicating a past result of performing a dynamic action represented by the dynamic node; each of the set of static nodes has a static-node weight that was defined based on a backpropagation of at least one of the dynamic-node weights; and each of at least some of the dynamic nodes and each of at least some of the static nodes is associated with a point value generated using the backpropagation; accessing a partial protocol definition that includes at least one action; generating an auto-completion of the partial protocol definition using the master tree, at least some of the dynamic-node weights, and at least some of the static-node weights; and outputting a representation of an auto-completed protocol definition.

In some aspects, generating the auto-completion of the partial protocol definition includes: identifying multiple potential auto-completed protocol definitions; determining, for each of the multiple potential auto-completed protocol definitions, a quantity of common nodes that are present both in the potential auto-completed protocol definition and in the partial protocol definition; determining, for each of the multiple potential auto-completed protocol definitions, a score based on point values associated with nodes in the potential auto-completed protocol definition; and selecting a particular one of the multiple potential auto-completed protocol definitions based on the quantities of common nodes and the scores associated with the multiple potential auto-completed protocol definitions, wherein the auto-completion of the partial protocol definition uses the particular one of the multiple potential auto-completed protocol definitions.

In some aspects, generating the auto-completion of the partial protocol definition includes: accessing a convolution to transform individual paths in the master tree to corresponding vectors; transforming the partial protocol definition to a partial-protocol vector using the convolution; identifying multiple potential auto-completed protocol definitions; transforming each of the multiple potential auto-completed protocol definitions to a potential auto-completed protocol vector using the convolution; using a machine-learning model to assess, for each of the multiple potential auto completed protocol definitions, a similarity score characterizing a similarity between the potential auto-completed protocol vector and the partial-protocol vector; and selecting a particular one of the multiple potential auto-completed protocol definitions based on the similarity scores, wherein the auto-completion of the partial protocol definition uses the particular one of the multiple potential auto-completed protocol definitions.

In some aspects, the master tree comprises a union of individual protocol definitions.

In some aspects, the master tree comprises a set of individual protocol definitions when individual protocol definitions are disjoint from each other.

In some aspects, a first action includes transmitting an email with particular first content.

In some aspects, the set of dynamic nodes are associated with one or more performance measures.

In some aspects, a non-transitory computer-readable medium storing a set of instructions includes: one or more instructions that, when executed by one or more processors of a computing device, cause the computing device to: accessing a master tree that was generated using a plurality of protocol definitions, wherein: each of the plurality of protocol definitions identifies an ordered set of actions and specifies, for each sequential pair of actions in the ordered set of actions, an action-advancement condition that identifies a criterion for advancing across the sequential pair of actions in the ordered set of actions so as to trigger a later of the sequential pair of actions; the master tree includes a set of dynamic nodes and a set of static nodes; each of the set of dynamic nodes represents an action that was identified in at least one of the plurality of protocol definitions; each of the set of static nodes represents an action-advancement condition specified in one or more of the plurality of protocol definitions; the master tree is configured such that, for each of the plurality of protocol definitions, a path through a subset of set of static nodes and through a subset of the set of dynamic nodes represents the protocol definition; each of the set of dynamic nodes has a dynamic-node weight that was defined based on data indicating a past result of performing a dynamic action represented by the dynamic node; each of the set of static nodes has a static-node weight that was defined based on a backpropagation of at least one of the dynamic-node weights; and each of at least some of the dynamic nodes and each of at least some of the static nodes is associated with a point value generated using the backpropagation; accessing a partial protocol definition that includes at least one action; generating an auto-completion of the partial protocol definition using the master tree, at least some of the dynamic-node weights, and at least some of the static-node weights; and outputting a representation of an auto-completed protocol definition.

In some aspects, the one or more instructions, that cause the computing device to generate the auto-completion of the partial protocol definition, cause the computing device to: identify multiple potential auto-completed protocol definitions; determine, for each of the multiple potential auto-completed protocol definitions, a quantity of common nodes that are present both in the potential auto-completed protocol definition and in the partial protocol definition; determine, for each of the multiple potential auto-completed protocol definitions, a score based on point values associated with nodes in the potential auto-completed protocol definition; and select a particular one of the multiple potential auto-completed protocol definitions based on the quantities of common nodes and the scores associated with the multiple potential auto-completed protocol definitions, wherein the auto-completion of the partial protocol definition uses the particular one of the multiple potential auto-completed protocol definitions.

In some aspects, the one or more instructions, that cause the computing device to generate the auto-completion of the partial protocol definition, cause the computing device to: access a convolution to transform individual paths in the master tree to corresponding vectors; transform the partial protocol definition to a partial-protocol vector using the convolution; identify multiple potential auto-completed protocol definitions; transform each of the multiple potential auto-completed protocol definitions to a potential auto-completed protocol vector using the convolution; use a machine-learning model to assess, for each of the multiple potential auto completed protocol definitions, a similarity score characterizing a similarity between the potential auto-completed protocol vector and the partial-protocol vector; and select a particular one of the multiple potential auto-completed protocol definitions based on the similarity scores, wherein the auto-completion of the partial protocol definition uses the particular one of the multiple potential auto-completed protocol definitions.

In some aspects, the master tree comprises a union of individual protocol definitions.

In some aspects, the master tree comprises a set of individual protocol definitions when individual protocol definitions are disjoint from each other.

In some aspects, a first action includes transmitting an email with particular first content.

In some aspects, the set of dynamic nodes are associated with one or more performance measures.

In some aspects, a computing device includes: one or more memories; and one or more processors, communicatively coupled to the one or more memories, configured to: accessing a master tree that was generated using a plurality of protocol definitions, wherein: each of the plurality of protocol definitions identifies an ordered set of actions and specifies, for each sequential pair of actions in the ordered set of actions, an action-advancement condition that identifies a criterion for advancing across the sequential pair of actions in the ordered set of actions so as to trigger a later of the sequential pair of actions; the master tree includes a set of dynamic nodes and a set of static nodes; each of the set of dynamic nodes represents an action that was identified in at least one of the plurality of protocol definitions; each of the set of static nodes represents an action-advancement condition specified in one or more of the plurality of protocol definitions; the master tree is configured such that, for each of the plurality of protocol definitions, a path through a subset of set of static nodes and through a subset of the set of dynamic nodes represents the protocol definition; each of the set of dynamic nodes has a dynamic-node weight that was defined based on data indicating a past result of performing a dynamic action represented by the dynamic node; each of the set of static nodes has a static-node weight that was defined based on a backpropagation of at least one of the dynamic-node weights; and each of at least some of the dynamic nodes and each of at least some of the static nodes is associated with a point value generated using the backpropagation; accessing a partial protocol definition that includes at least one action; generating an auto-completion of the partial protocol definition using the master tree, at least some of the dynamic-node weights, and at least some of the static-node weights; and outputting a representation of an auto-completed protocol definition.

In some aspects, the one or more processors, when generating the auto-completion of the partial protocol definition, are configured to: identify multiple potential auto-completed protocol definitions; determine, for each of the multiple potential auto-completed protocol definitions, a quantity of common nodes that are present both in the potential auto-completed protocol definition and in the partial protocol definition; determine, for each of the multiple potential auto-completed protocol definitions, a score based on point values associated with nodes in the potential auto-completed protocol definition; and select a particular one of the multiple potential auto-completed protocol definitions based on the quantities of common nodes and the scores associated with the multiple potential auto-completed protocol definitions, wherein the auto-completion of the partial protocol definition uses the particular one of the multiple potential auto-completed protocol definitions.

In some aspects, the one or more processors, when generating the auto-completion of the partial protocol definition, are configured to: access a convolution to transform individual paths in the master tree to corresponding vectors; transform the partial protocol definition to a partial-protocol vector using the convolution; identify multiple potential auto-completed protocol definitions; transform each of the multiple potential auto-completed protocol definitions to a potential auto-completed protocol vector using the convolution; use a machine-learning model to assess, for each of the multiple potential auto completed protocol definitions, a similarity score characterizing a similarity between the potential auto-completed protocol vector and the partial-protocol vector; and select a particular one of the multiple potential auto-completed protocol definitions based on the similarity scores, wherein the auto-completion of the partial protocol definition uses the particular one of the multiple potential auto-completed protocol definitions.

In some aspects, the master tree comprises a union of individual protocol definitions.

In some aspects, the master tree comprises a set of individual protocol definitions when individual protocol definitions are disjoint from each other.

In some aspects, a first action includes transmitting an email with particular first content.

These and other embodiments of the disclosure, along with many of its advantages and features, are described in more detail in conjunction with the text below and corresponding figures.

BRIEF DESCRIPTION OF THE DRAWINGS

Like reference, symbols in the various drawings indicate like elements, in accordance with certain example implementations. In addition, multiple instances of an element may be indicated by following a first number for the element with a letter or a hyphen and a second number.

DETAILED DESCRIPTION OF THE DRAWINGS

Figure 1:
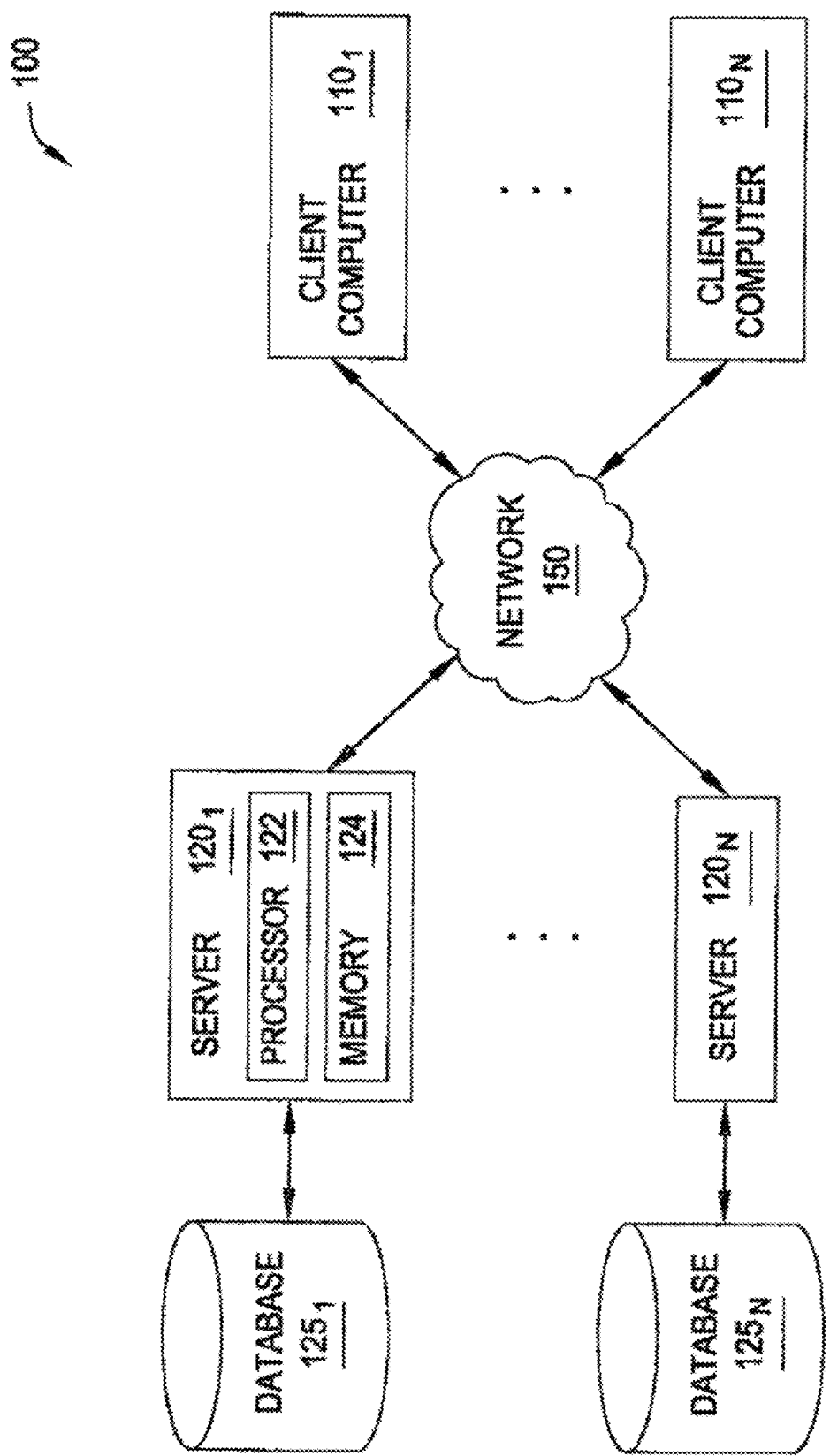
FIG. 1 illustrates a networked computer environment in which embodiments of the disclosure may be practiced.

The following detailed description of example implementations refers to the accompanying drawings. The same reference numbers in different drawings may identify the same or similar elements.

Communications between multiple systems is iterative, specific details of an individual communication (e.g., content, transmission time, etc.) is determined based on whether, when or how another system responded to a previous communication. To capture a general strategy for iteratively communicating from one system to a user system, a protocol definition can be defined, which defines an ordered set of actions. For each of one or more actions in the ordered set of actions, the protocol definition can identify an action-advancement condition that identifies a criterion for advancing across the sequential pair of actions so as to trigger a later of the sequential pair of actions. For example, the criterion may be defined to be satisfied when a given period of time has passed since a previous communication was transmitted to the user system. As another example, the criterion may be defined to be satisfied upon receiving a communication from the user system that corresponds to a request for particular content.

As a particular illustration of an exemplary protocol definition, a first action can include transmitting an email with particular first content. A first action-advancement condition may include a criterion that is configured to be satisfied if a responsive communication (e.g., that indicates that a user clicked on a link in the email) is not received within a predefined period of time. A second action that is to be triggered if and when the first action-advancement may include transmitting another email with different particular second content.

An individual protocol definition can be evaluated objectively based on (for example) whether, when, and how a user system responded to the action(s). For example, a point value may be determined based on a percentage or number of implementations of the protocol definition that led to receipt of a given responsive communication from a user system and/or receipt of a request from a user system that a physical object availed on a website identified in a communication be sent to the user. A score for the protocol definition can be defined to be a sum or weighted sum of the point value or—if only one point value exists for the protocol definition—to be the point value.

In some embodiments, a master tree is defined as a structure for efficiently representing multiple protocol definitions. The master tree can be generated that includes a set of dynamic nodes and a set of static nodes. Each of the set of dynamic nodes can represent an action that was identified in at least one of the plurality of protocol definitions. Each of the set of static nodes can represent an action-advancement condition specified in one or more of the plurality of protocol definitions. The master tree can be configured such that, for each of the plurality of protocol definitions, a path through a subset of set of static nodes and through a subset of the set of dynamic nodes represents the protocol definition. Constructing the tree may include first identifying the unique actions represented in the plurality of protocol definitions. In some instances, this identification may include determining that various actions are sufficiently similar to be mapped to a same action node, in which case the action node may be more general and/or less precise than the corresponding actions in the protocol definitions. Similarly, constructing the tree may include identifying unique action-advancement criteria in the plurality of protocol definitions. This may be performed on an active-node-pair basis, so as to identify each action-advancement criteria that conditions whether a first action identified at a first active node is to be followed by a second action identified at a second active node. In some instances, this identification may include determining that various action-advancement criteria are sufficiently similar to be mapped to a same static node, in which case the static node may be more general and/or less precise than the corresponding action-advancement criteria in the protocol definitions. The master tree may be constructed such that each protocol definition can be represented by a particular path in the master tree that extends between various active and static nodes.

Each of the set of dynamic nodes can include a dynamic-node weight that can be defined based on data indicating a past result of performing a dynamic action represented by the dynamic node. Each of the set of static nodes can have a static-node weight that can be defined based on a backpropagation of at least one of the dynamic-node weights. Each of at least some of the dynamic nodes and each of at least some of the static nodes can be associated with a point value generated using the backpropagation. The weights can be used to evaluate various paths or various actions in the master tree.

A partial protocol definition is a protocol definition that has not been completed by a client. The partial protocol definition can include at least one action. The partial protocol definition can include one or more actions and/or one or more action-advancement conditions. In various embodiments, a client has requested data to facilitate identifications of one or more new actions and/or one or more new action-advancement conditions to complete the partial protocol definition. Each partial protocol definition can be mapped to a partial path, where a dynamic node is identified (or defined) for each of the one or more actions and a static node is identified (or defined) for each of the one or more action-advancement conditions.

Determining a recommendation for auto-completing the partial path can include evaluating each of two or more completed paths for the auto-completion. The evaluation can include generating a confidence metric (representing a confidence of an auto-completion generated based on a given completed path resulting in a target response), where the confidence metric is determined by: (1) determining the extent to which at least part of the completed path overlaps with and/or is similar to the partial path; and (2) determining a score for the completed path that indicates an extent to which the represented protocol led to a target result (e.g., accepting a request from a user for a virtual or physical object to be transmitted to the user). The confidence metric may be positively correlated with each of the overlap extent and with the score.

The techniques can compute the similarity using a graph-based technique or by transforming individual paths (and the partial path) into corresponding vectors (e.g., using graph2vec) and determining vector similarities.

In a non-limiting example, the protocol definitions can include business execution actions, such as marketing campaigns, compensation calculation models, and supply chain management. In the marketing campaign example, a client can use a business process management (BPM) engine to configure a series of connected workflow execution components that make up a marketing campaign. Some BPM engines allow the marketer to visually design, manage, and automate a multi-stage lifecycle protocol definition through a drag-and-drop user interface and a library of pre-built program templates. Actions can include (for example) sending an email, sending a text message, or calling a user so as to identify content that identifies one or more products, services, or discounts.

FIG. 1 illustrates an embodiment of a system to autocomplete a partial protocol definition. FIG. 1 illustrates a networked computer environment in which embodiments may be practiced. As shown, the networked computer environment can include a plurality of client computers 110 (only two of which are shown) and a plurality of server computers 120 with associated content databases 125 for storing content. The client computers 110 and the server computers 120 can be connected over a network 150, e.g., the Internet.

Each client computer 110 can include conventional components of a computing device, e.g., a processor, system memory, a hard disk drive, input devices such as a mouse and a keyboard, and output devices such as a monitor, among others. Each server 120 can include a processor 122 and a system memory 124, and manages the contents stored in its respective content storage unit using, e.g., a relational database. The servers 120 can be programmed to communicate with the client computers 110 and other servers using the TCP/IP protocol. The client computers 110 can be programmed to execute web browser programs and other software applications and access the web pages and/or applications managed by the servers by specifying a uniform resource locator (URL) for the server into the web browser.

In embodiments described below, users are respectively operating the client computers 110 that can be connected to the servers 120 over the Internet. The web pages that are displayed to a user can be transmitted from the servers 120 to that user's client computer 110 and processed by the web browser program stored in that user's client computer 110 for display through the monitor of that user's client computer 110.

Client computer 110 may be a personal computer, smart phone, touch pad, touch screen, or any other device suitable for practicing one or more embodiments of the present invention. It should be noted that the present disclosure can be implemented in hardware, software, or in a combination of hardware and software, e.g., using application specific integrated circuits (ASIC), a general purpose computer or any other hardware equivalents.

In one embodiment, a protocol definition can be stored in memory of the client computer 110 and executed by the processor within the client computer. In other embodiments, the BPM engine may be stored in the memory 124 of the server 120 and executed by the processor 122. The server 120 can be configured to deliver a user interface to the user at the client computer 110 via the network 150. For example, the user interface can be displayed in a web browser executed by the client computer 110.

As described, embodiments disclosed herein provide techniques for analyzing and autocompleting a protocol definition. According to an embodiment, a protocol definition including a plurality of stages, and in which execution of the program follows a plurality of distinct paths, can be represented as a graph, and unique paths of the program are determined by traversing the graph. Further, execution boundaries of the program which correspond to distinct process threads can be determined by identifying stages which begin new execution boundaries. A database can be used to store and manage information on the determined program paths and execution boundaries, and the information itself may be used to analyze and tune the protocol definition.

Figure 2:
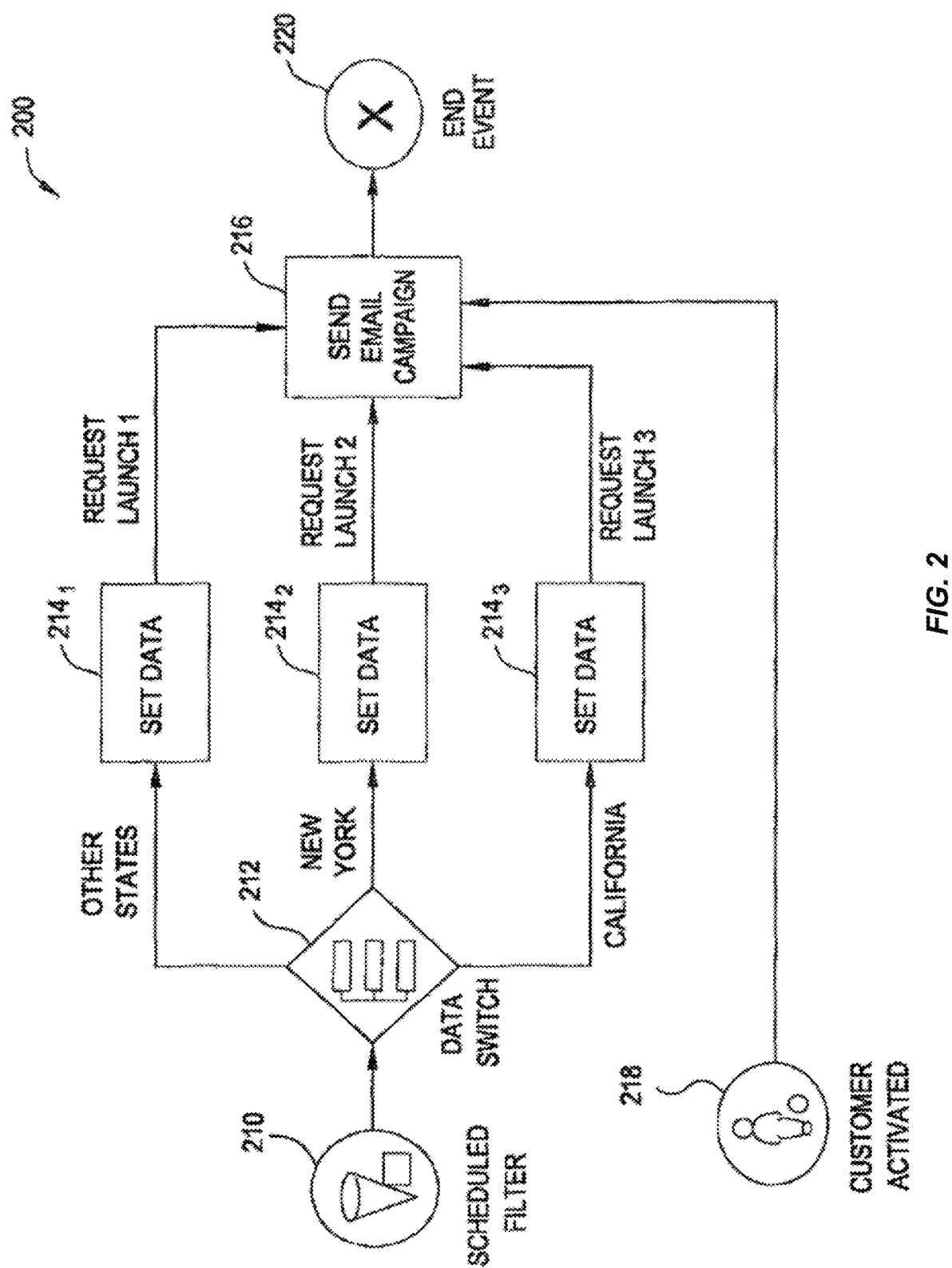
FIG. 2 is a conceptual diagram of a protocol definition.

FIG. 2 is a conceptual diagram of a protocol definition 200. In one embodiment, a BPM engine allows a user to visually design, manage, and automate a multi-stage lifecycle program through a drag-and-drop user interface and a library of pre-built program templates. The example shown in FIG. 2 illustrates a protocol definition 200 designed by a marketer.

As shown, the protocol definition 200 begins with stage 210, which is a scheduled filter stage. In one embodiment, a stage is an abstract class that represents a component within the protocol definition 200. Other examples of stages include an email campaign stage, an SMS (short message service) campaign stage, an elapsed timer stage, a gateway (or "switch") stage, or any other technically feasible type of stage. In some embodiments, different business logic may be associated with each of the different types of stages. As used herein, a "scheduled filter" refers to a stage in which a filter or a stored query (e.g., a saved SQL view) is run against an associated list once or on a recurring schedule (daily, weekly or monthly), with resulting matching customers being fed into the protocol definition.

The input to the scheduled filter stage 210 comprises a plurality of work items, also referred to as "process instances" or "enactments." In the example shown in FIG. 2, each work item may represent a different user to which marketing content may be targeted. In one embodiment, at the scheduled filter stage 210, work items (i.e., users) in the input group of work items are filtered according to a predefined condition or conditions. For example, the scheduled filter 210 may be configured to run every day at midnight to filter users and return a list of users whose birthday is on that day.

As shown, stage 212 is a data switch stage which splits an input group of work items into three groups according to a data switch condition. Illustratively, the input group is split according to geography data associated with the input work items, with California residents, New York residents, and residents of other states being split into three separate groups that are processed in respective paths. Then, at stages 214

1-3, the groups are processed by setting data of email messages targeted to those groups. For example, California residents, New York residents, and residents of other states may each receive different promotional offers, and the BPM engine may set data in the email messages targeted to each group to indicate the appropriate promotional offer.

Stage 216 is an email campaign stage in which the BPM engine sends email messages to work items in input group(s). Illustratively, a request to launch the appropriate email campaign is made after each of the data setting stages 214 1-3 is executed. In response, multiple launches may be made, and server resources such as memory and processing cycles may be separately consumed for each launch, which unduly burdens the server. For example, if three launches are performed, three launch requests may be made, information (i.e. first name, last name, address etc. for each user in the group) may be retrieved three times from the database, scrubbing (e.g., removing duplicate user records based on email address, suppressing user records based on invalid email domains, suppressing users who appear on a global suppression list, etc.) may be performed three times, and an initial setup process may also be executed three times. Other miscellaneous activities such as schedulers, data base activity, caching, I/O are also not minimized where three launches are made rather than a single launch.

In one embodiment, the BPM engine may determine, using program path and execution boundary information, whether the scheduled filter 210 and the email campaign 216 stages are connected by more than one path and if these stages execute in the same thread boundary, with a "thread boundary" including one or more stages which are executed by the same thread on, e.g., a distinct server computer. If such is the case, the BPM engine may wait for all set data stages 214 1-3 to finish executing, merge the multiple groups of work items output by these paths into a single merged group, and launch a single email campaign for the merged group, thereby conserving server resources.

Figure 3:
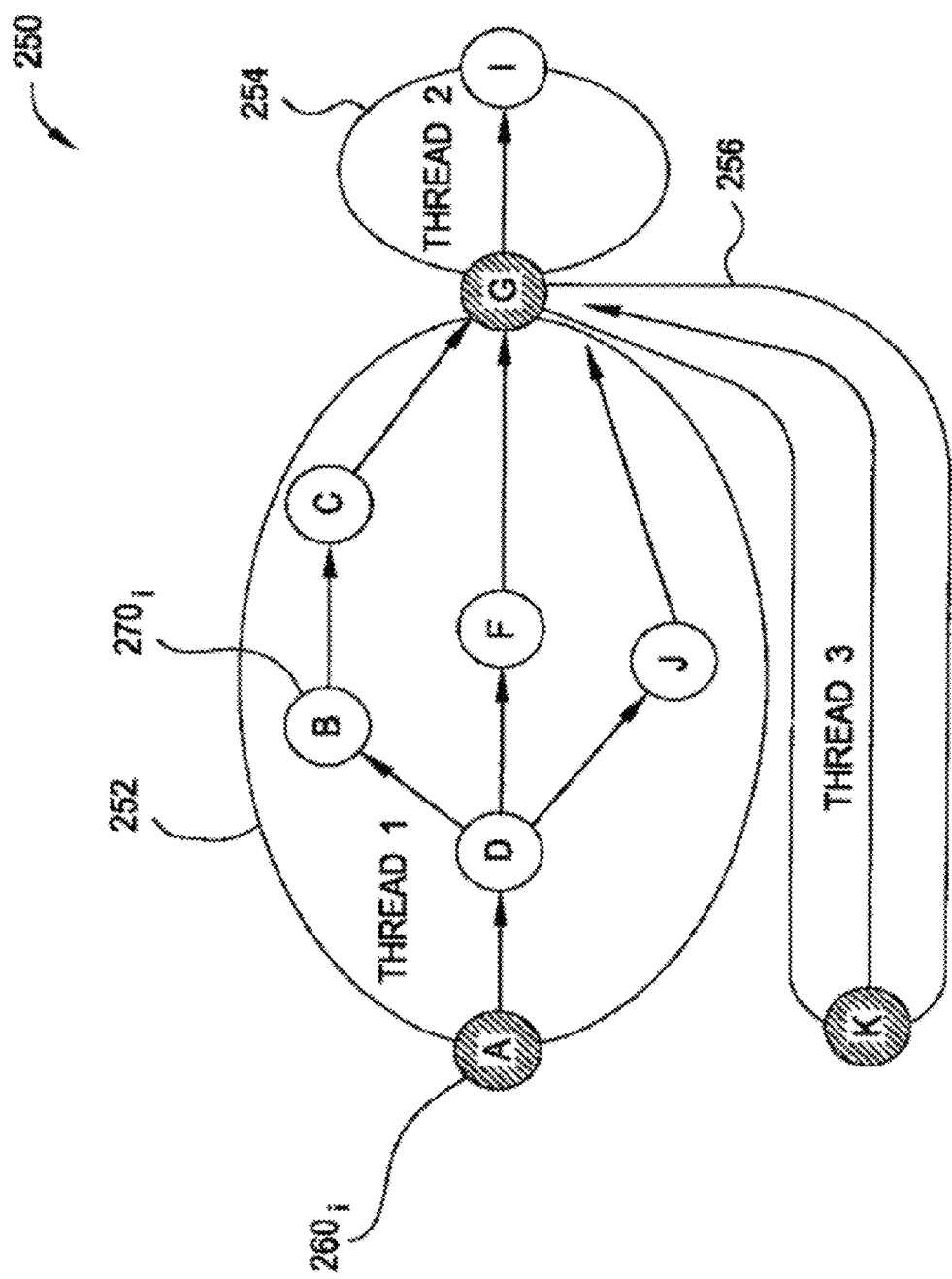
FIG. 3 illustrates a directional graph which represents the protocol definition of FIG. 2 and thread boundaries of the protocol definition, according to one embodiment

FIG. 3 illustrates a graph 250 which represents a protocol definition 200 of FIG. 2 and thread boundaries of the protocol definition 200, according to one embodiment. As shown, the graph 250 is a directional graph which includes nodes 260 $i$ and 270 $i$, each of which corresponds to one of the stages of the protocol definition 200. That is, the graph 250 may be generated from the protocol definition 200 by creating one graph node for each stage in the program 200 and connecting the nodes according to the execution flow of the program 200. As discussed in greater detail below, the graph 250 may then be traversed to identify unique paths through the protocol definition 200, and the unique paths may be normalized and persisted in a database for later analysis and program tuning. For example, unique paths through the protocol definition 200 can include (1) A→D→B→C→G→1; (2) A→D→F→G→I; (3) A→D→J→G→I; and (4) K→G→I.

As shown, shaded nodes 260 $i$ represent thread creator stages (also referred to herein as thread boundary creator stages), while unshaded nodes 270 $i$ represent thread follower stages. In one embodiment, thread creator stages may be stages which start new execution (thread) flows. Illustratively, thread creator stages represented by nodes A, G, and K start threads 1, 2, and 3, respectively. Each such thread may itself include one or more stages and be executed on, e.g., a separate server computer. Note, while nodes A, G, and K represent thread creator stages, the boundaries of threads are defined by the pairs A-G, K-G, and G-I. For example, A and G are within the same thread boundary, as they define the boundary of thread 1.

Stages which execute in a thread but do not start the thread are thread follower stages, represented by unshaded nodes 270 $i$. Such thread follower stages are generally not self-initiated, and are instead initiated by a thread creator stage or another thread follower stage. Thread creator and thread follower stages may generally be distinguished based on characteristics of the stages. In one embodiment, a user may specify certain types of stages as thread creator stages and other types of stages as thread follower stages. Examples of thread creator stages may include start event stages for customer activation, customer deactivation, scheduled filters, and custom events; timer stages such as elapse timers, target timers, and end timers; and campaign activity stages such as email campaigns, SMS campaigns, and other forms of communications to customers. An example of a thread follower stage is a set data stage. Other examples of thread follower stages may include switch stages for selecting between alternatives, such as data switches, allocation switches, and performance switches. As used herein, a customer activation stage refers to a stage in which a new customer/user is added into the system, or a previously deactivated user is re-activated, using, e.g., email, mobile, social, display or web channels. Deactivation can generally be the opposite of activation. As used herein, a set data stage refers to a stage in which a list field or profile extension field is either set to a given value, or the value is modified by a specified amount or changed to a value that is supplied by an event. A protocol definition developer can be allowed to choose one of these approaches and the field value to set. As used herein a send email campaign stage refers to a stage in which email campaign messages are sent to users. As used herein, a timer is a stage which waits for a specified amount of time or until a specific date/time. For example, a timer may be included in a protocol definition to allow message recipients to respond to the campaign before sending follow-up messages. An elapsed timer in particular may wait for a specified number of days before moving to the next program stage. As used herein, an end event refers to a stage which terminates a program flow, exiting the program.

Figure 4:
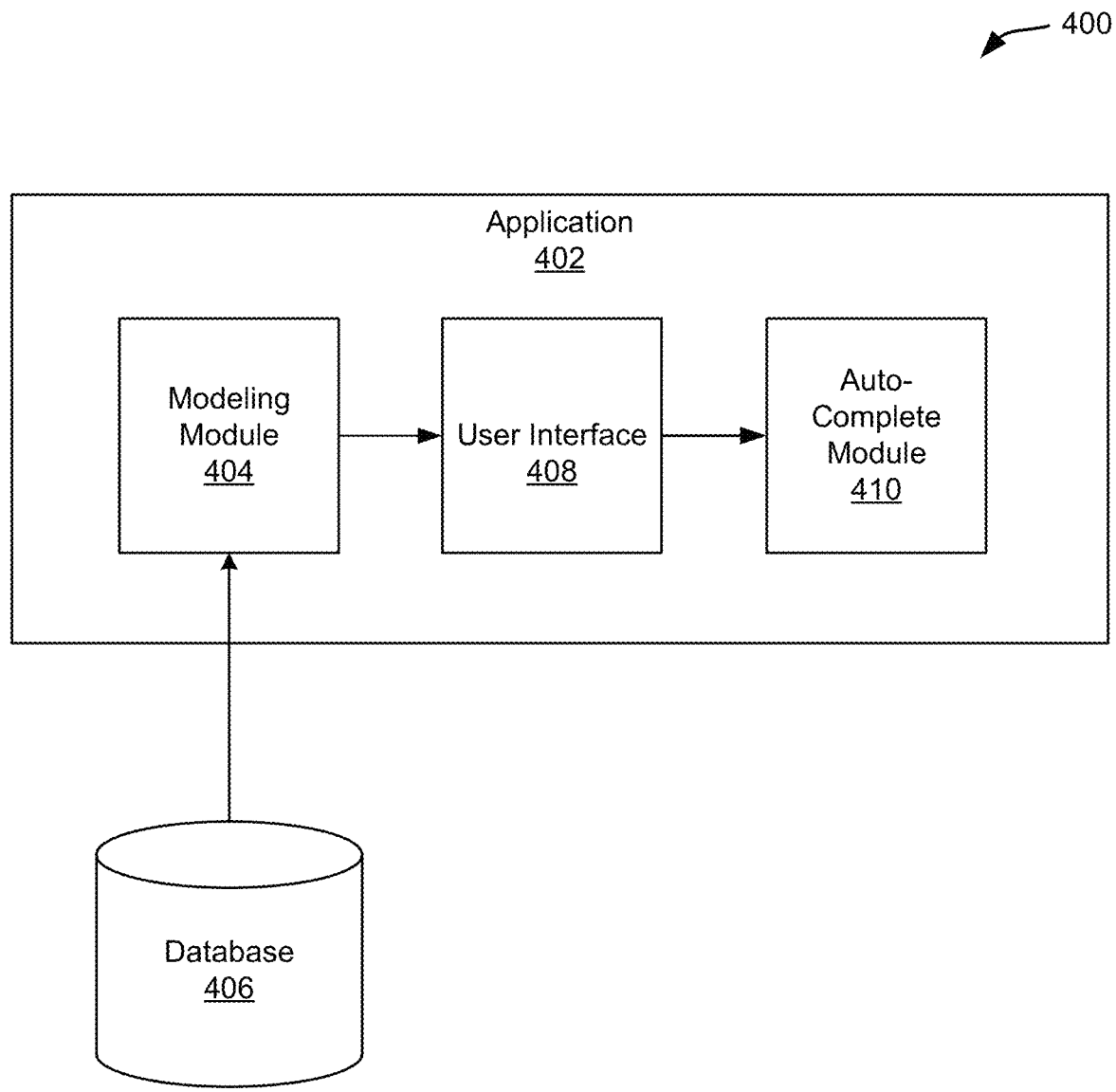
FIG. 4 illustrates an embodiment of a system to autocomplete a protocol definition.

FIG. 4 illustrates a block diagram 400 for autocompleting a partial protocol definition. An application 402 can include various routines. The application 402 can be a cloud-based application. A modeling module 404 can receive stored data from a database 406. The data can include a master tree that was generated using a plurality of protocol definitions stored in database 406. Each of the plurality of protocol definitions can identify an ordered set of actions and specifies, for each sequential pair of actions in the ordered set of actions, an action-advancement condition that identifies a criterion for advancing across the sequential pair of actions in the ordered set of actions so as to trigger a later of the sequential pair of actions. The master tree can includes a set of dynamic nodes and a set of static nodes. Each of the set of dynamic nodes can represent an action that was identified in at least one of the plurality of protocol definitions. Each of the set of static nodes can represent an action-advancement condition specified in one or more of the plurality of protocol definitions. The master tree can be configured such that, for each of the plurality of protocol definitions, a path through a subset of set of static nodes and through a subset of the set of dynamic nodes represents the protocol definition.

Each of the set of dynamic nodes has a dynamic-node weight that was defined based on data indicating a past result of performing a dynamic action represented by the dynamic node. Each of the set of static nodes has a static-node weight that was defined based on a backpropagation of at least one of the dynamic-node weights. Each of at least some of the dynamic nodes and each of at least some of the static nodes can be associated with a point value generated using the backpropagation.

The master tree can be generated by analyzing a plurality of protocol definitions. Protocol definitions that have been executed over a period of time may have additional information that can define the performance of the protocol definition. The master tree can be stored in database 406.

The application 402 can include a user interface 408. The user interface 408 can allow entry a of a new protocol definition. The protocol definition can be defined using a plurality of icons in a graphical user interface. The icons can be connected using the user interface 408 such that a plurality of paths can be determined. Each of the paths can include a plurality of dynamic nodes and static nodes. The new protocol definition may not be complete hence the new protocol definition can be known as a partial protocol definition. The application 402 can leverage the knowledge gained from previous protocol definitions stored in the database 406.

An autocomplete module 410 can analyze the stored data in the database 406. The stored data cab include but is not limited to the various protocol definitions, dynamic nodes, static nodes, dynamic node weights, static node weights, point values, and action-advancement conditions. The autocomplete module 410 can perform a machine learning technique or a vector analysis technique to generate an auto-completion of the partial protocol definition using the master tree, at least some of the dynamic-node weights, and at least some of the static-node weights. The autocomplete module 410 can output a representation of an auto-completed protocol definition.

Figure 5:
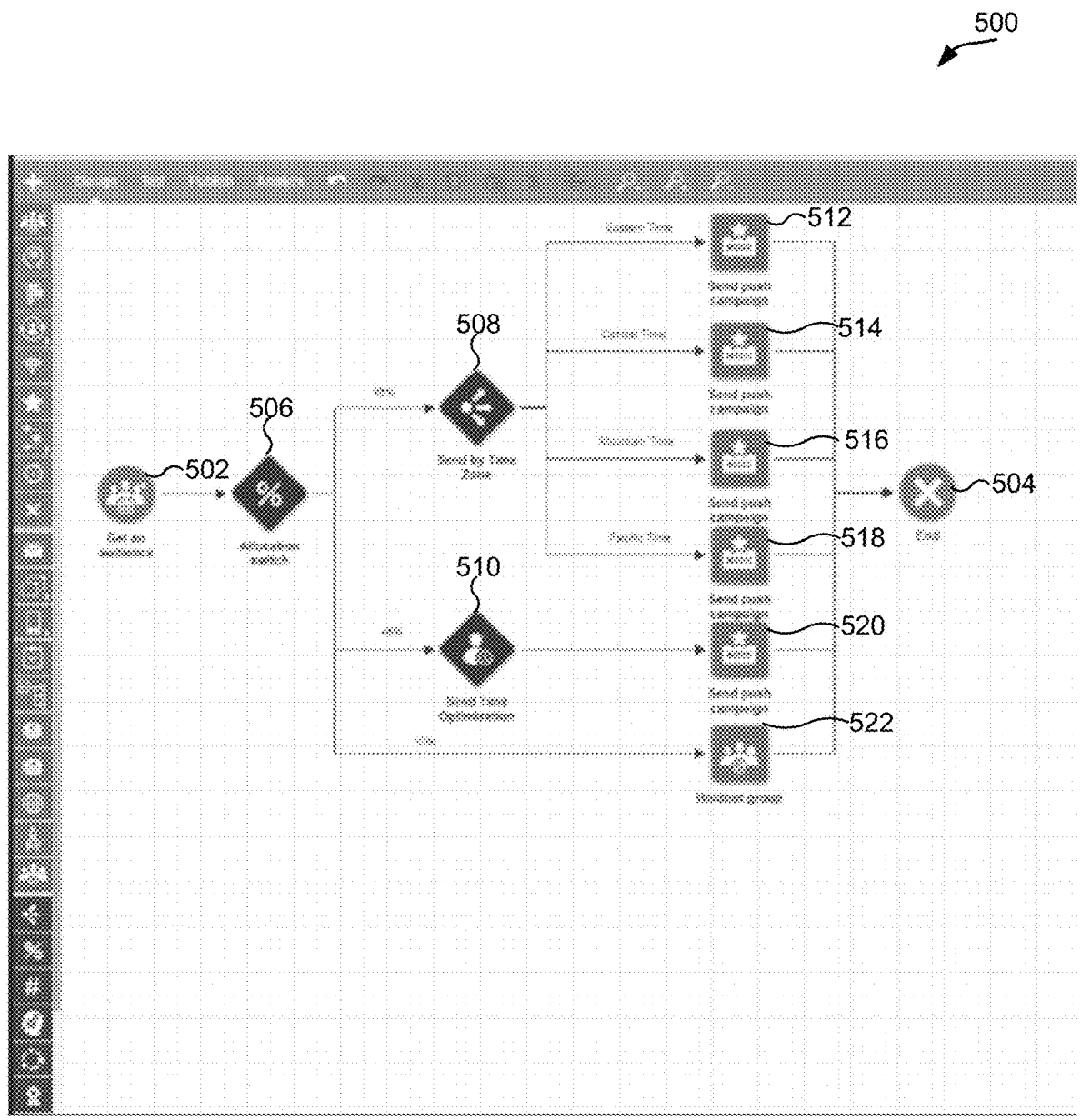
FIG. 5 illustrates a first exemplary protocol definition.

FIG. 5 illustrates an exemplary protocol definition 500. The protocol definition 500 can include an entry point 502 and an exit point 504. The protocol definition 500 can identify an ordered set of actions and specifies, for each sequential pair of actions in the ordered set of actions, an action-advancement condition that identifies a criterion for advancing across the sequential pair of actions in the ordered set of actions so as to trigger a later of the sequential pair of actions.

The protocol definition 500 can include an action such as an allocation switch 506. The allocation switch 506 can divide up digital resources by various conditions. Allocation switches 506 can randomly divert a percentage of your recipients down an alternate path. These can be used for simple split testing, but they are most effective when used in conjunction with performance switches. In FIG. 5, allocation switch 506 can divide communications by time zone (e.g., 45%), an optimized time (e.g., 45%) or to a holdout group (10%).

A data switch 506 can alter the path of a protocol definition based on one or more rules. In the example in FIG. 5, the actions can vary based on a rule regarding the time zone. In the first time zone (e.g., Eastern Time Zone), a first push notification 512 can be sent out to recipients. In the second time zone (e.g., Central Time Zone), a second push notification 514 can be sent out to recipients. In the third time zone (e.g., Mountain Time Zone), a third push notification 516 can be sent out to recipients. In the fourth time zone (e.g., Pacific Time Zone), a fourth push notification 518 can be sent out to recipients. The data switch 506 can be used to send a message at an effective time for a recipient (e.g., avoid early morning or late at night).

An optimization switch 510 can determine an optimal send time to conduct the action (e.g., a fifth push notification 520). A portion of the digital resources can be apportioned to a holdout group 522. A holdout group 522 can be used to compare the performance of contacts who received the campaign to those who did not.

Figure 6:
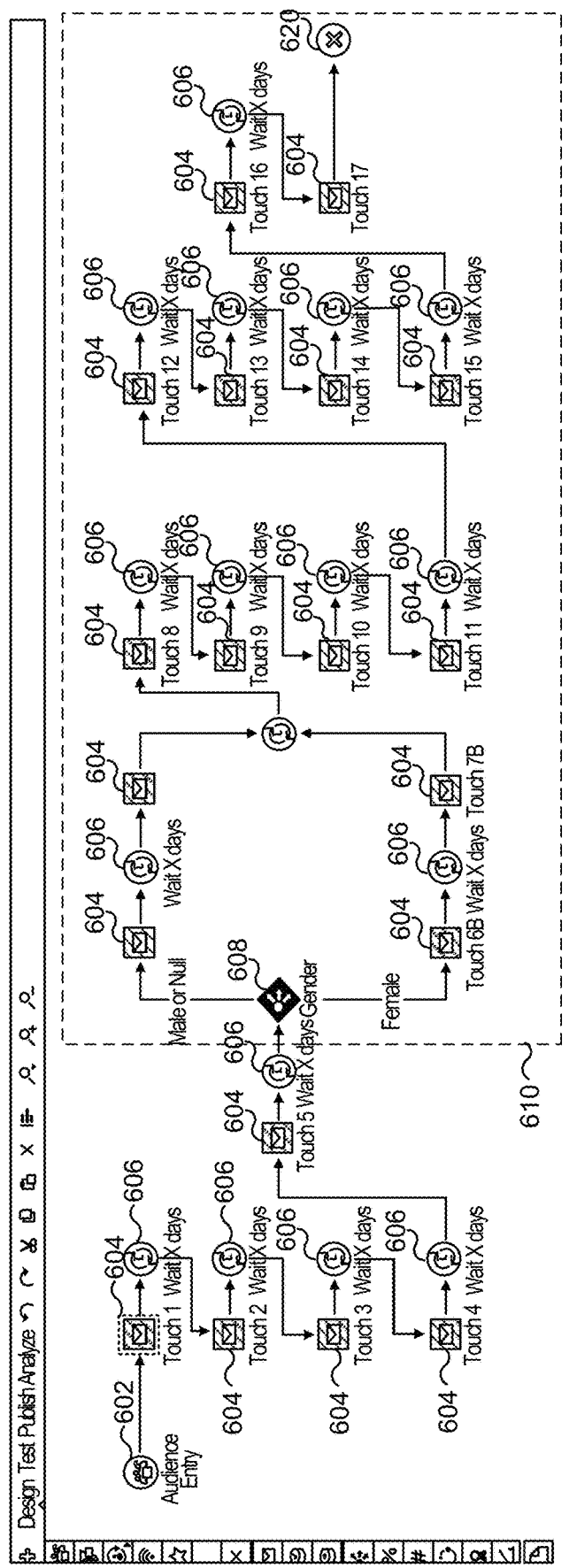
FIG. 6 illustrates an example of a master tree.

FIG. 6 illustrates an example of a master tree 600. The master tree can includes a set of dynamic nodes and a set of static nodes.

An entry point 602 to the master tree 600 defines the beginning of the process. The master tree 600 can include a plurality of dynamic nodes 604 (e.g., email campaigns). Each of the set of dynamic nodes 604 can represent an action that was identified in at least one of the plurality of protocol definitions. In addition the master tree 600 can include a plurality of static nodes 606 (e.g., timers). Each of the set of static nodes 606 can represent an action-advancement condition specified in one or more of the plurality of protocol definitions.

The master tree 600 can be configured such that, for each of the plurality of protocol definitions, a path through a subset of set of static nodes 606 and through a subset of the set of dynamic nodes 604 represents the protocol definition.

Each of the set of dynamic nodes 604 can include a dynamic-node weight that was defined based on data indicating a past result of performing a dynamic action represented by the dynamic node 604. Each of the set of static nodes 606 can include a static-node weight that was defined based on a backpropagation of at least one of the dynamic-node weights. Each of at least some of the dynamic nodes 604 and each of at least some of the static nodes 606 can be associated with a point value generated using the backpropagation.

The master tree 600 can also include an end point 620.

Figure 7:
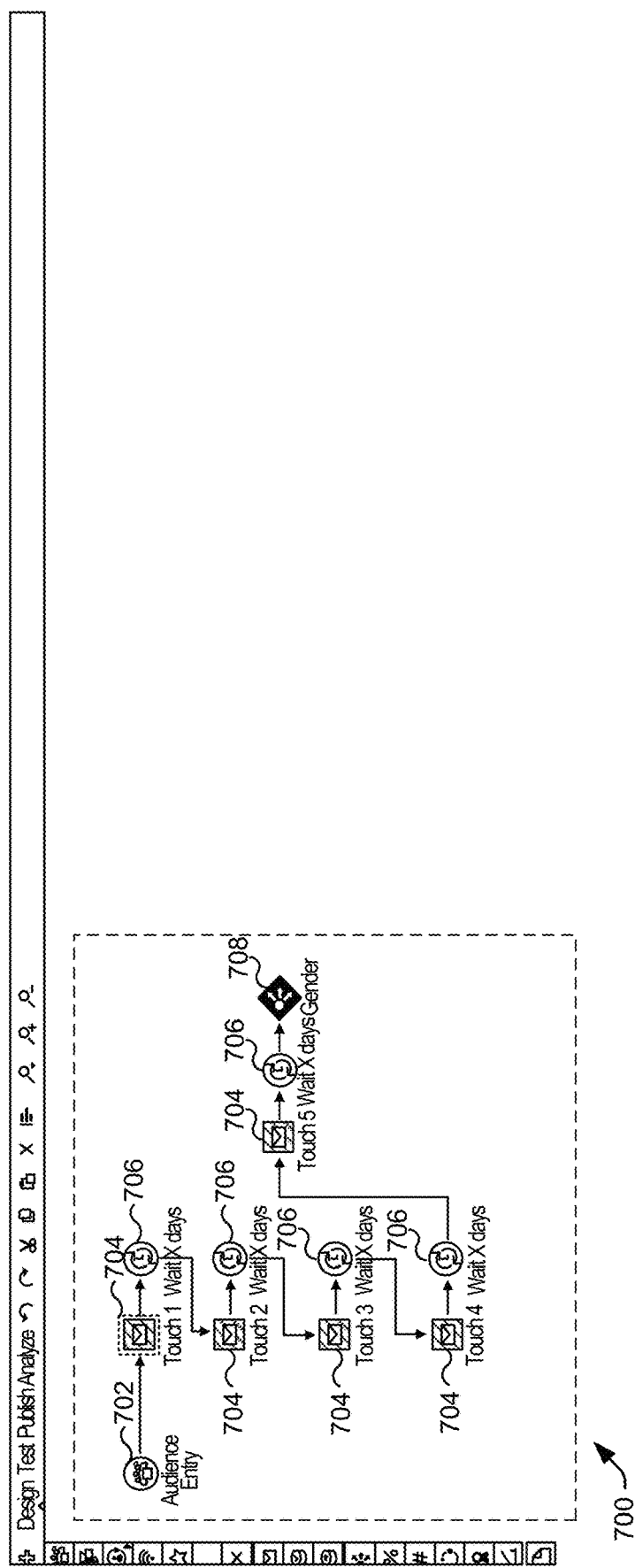
FIG. 7 illustrates a partial protocol definition.

FIG. 7 illustrates a partial protocol definition 700. The partial protocol definition 700 is not complete. An entry point 702 to the partial protocol definition 700 can define the beginning of the process. The partial protocol definition 700 can include a plurality of dynamic nodes 604 (e.g., email campaigns). Each of the set of dynamic nodes 604 can represent an action that was identified in at least one of the plurality of protocol definitions. In addition the partial protocol definition 700 can include a plurality of static nodes 606 (e.g., timers). Each of the set of static nodes 606 can represent an action-advancement condition specified in one or more of the plurality of protocol definitions.

The auto-complete module 410 as shown in FIG. 4 can leverage the information in the master tree 600 as shown in FIG. 6 to autocomplete the partial protocol definition 700. In various embodiments, the generating the auto-completion can include identifying multiple potential auto-completed protocol definitions. The auto-completed protocol definitions can be incorporated into a master tree 600 or in some embodiments multiple master trees.

The generating the auto-completion can include determining, for each of the multiple potential auto-completed protocol definitions, a quantity of common nodes that are present both in the potential auto-completed protocol definition and in the partial protocol definition 700. In the simplified example illustrated in FIG. 7 the partial protocol definition 700 can also be found in the master tree 600 in FIG. 6. The partial protocol definition 700 includes common nodes, specifically a common data switch 708.

The generating the auto-completion can include determining, for each of the multiple potential auto-completed protocol definitions, a score based on point values associated with nodes in the potential auto-completed protocol definition.

The generating the auto-completion can include selecting a particular one of the multiple potential auto-completed protocol definitions based on the quantities of common nodes and the scores associated with the multiple potential auto-completed protocol definitions, wherein the auto-completion of the partial protocol definition uses the particular one of the multiple potential auto-completed protocol definitions.

The auto-completion module 410 can recommend one or more of the dynamic nodes 604 or static nodes 606 to complete the partial protocol definition 700. For example, the auto-completion module 410 can recommend individual elements, such as individual dynamic mode elements or static node elements. In various embodiments, the auto-completion module 410 can include entire paths to the end point 620 to complete the protocol definition.

Figure 8:
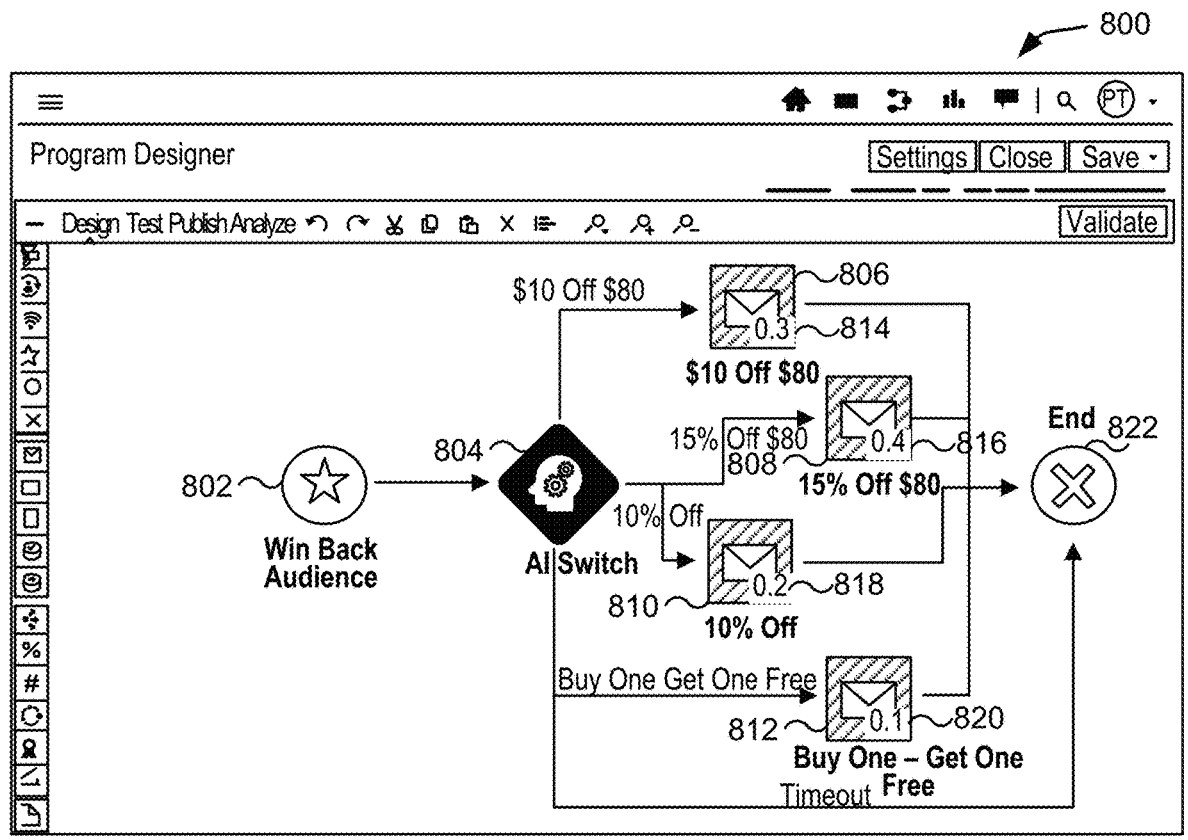
FIG. 8 illustrates a second exemplary protocol definition.
Figure 9:
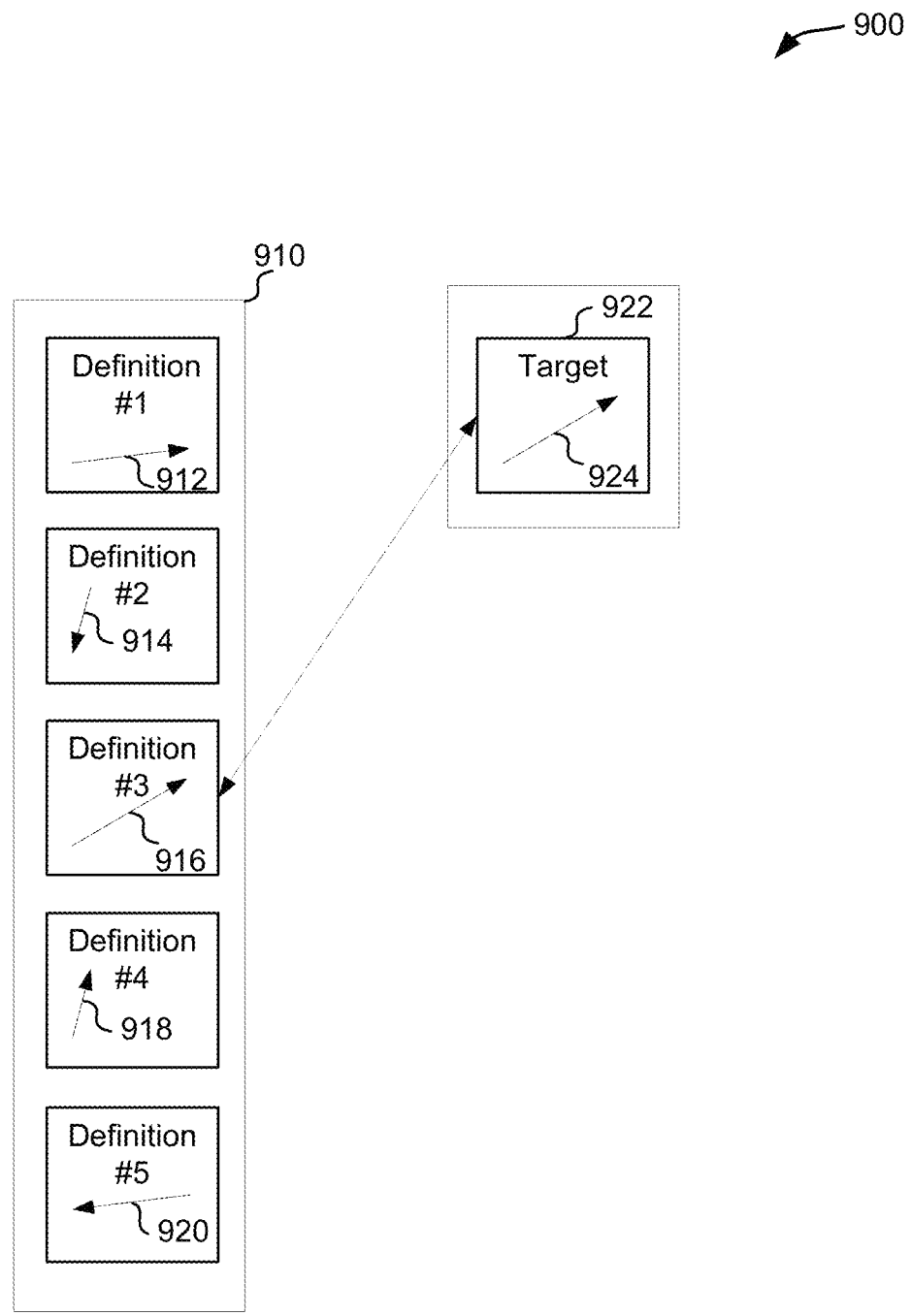
FIG. 9 illustrates a diagram illustrating an example evaluating program vectors, according to some aspects of the present disclosure.

FIG. 8 illustrates an exemplary protocol definition 800. The protocol definition 800 can include an entry point 802 and an exit point 822. The protocol definition 800 can include a plurality of dynamic nodes (e.g., 806, 808, 810, and 812). The protocol definition 800 can include an intelligent switch 804. The intelligent switch 804 can evaluates each user's behavioral data, then sends them down the best predicted path based on predictive models that analyze behavioral data. The best predicted path is the one that is predicted to be the best campaign, and channel. In addition, recipients are sent along the best path at the best time.

As described above in FIG. 7, each of the dynamic nodes 806, 808, 810, 812 can include a dynamic node weight 814, 816, 818, 820. The dynamic node weights 814, 816, 818, 820 can be defined based on data indicating a past result of performing a dynamic action represented by the dynamic node. For example, a second dynamic node 808 can have the highest dynamic node weight 816. The second dynamic node weight 816 can indicate the highest performing result of the plurality of dynamic nodes.

FIG. 5 is a diagram illustrating an example of a process 500 for evaluating protocol vectors, according to some aspects of the present disclosure.

In according to some embodiments, generating the auto-completion of the partial protocol definition can include accessing a convolution to transform individual paths in the master tree to corresponding vectors.

The auto-completion of the partial protocol definition can include transforming the partial protocol definition to a partial-protocol vector using the convolution.

The auto-completion of the partial protocol definition can include identifying multiple potential auto-completed protocol definitions.

The auto-completion of the partial protocol definition can include transforming each of the multiple potential auto-completed protocol definitions to a potential auto-completed protocol vector using the convolution.

The auto-completion of the partial protocol definition can include using a machine-learning model to assess, for each of the multiple potential auto completed protocol definitions, a similarity score characterizing a similarity between the potential auto-completed protocol vector and the partial-protocol vector.

The auto-completion of the partial protocol definition can include selecting a particular one of the multiple potential auto-completed protocol definitions based on the similarity scores, wherein the auto-completion of the partial protocol definition uses the particular one of the multiple potential auto-completed protocol definitions.

In some implementations, process 900 may be performed by the similarity detection system of the auto-completion module 410 of the application 401, however, the present disclosure is not limited thereto. As an illustrative example, definition vectors 910 may be the protocol definition formed after transforming the partial protocol definition to a partial-protocol vector using the convolution. Definition vectors 910 may include definition vector #1-912, definition vector #2-914, definition vector #3, definition vector #4, and definition vector #5. A vector may be generated, as described above, to represent each definition vector of definition vector 510 and the partial protocol definition 922. The partial protocol definition 922 may be represented by partial protocol definition vector 924. For example, vector 924 may match protocol definition #3 vector 916.

The auto-completion module 410 of the application 402, as shown in FIG. 4, for example, may compare the vector of each protocol definition (e.g., vectors 912, 914, 916, 918, 920) to the vector representing the partial protocol definition (e.g., vector 924) in a space, such as a Euclidean space or a cosine space. If, for example and as illustrated in FIG. 5, vector 916 is determined to be the closest vector to vector 924 representing the partial protocol definition in a vector space, then the application 402 may determine that definition protocol #3-916 includes dynamic nodes and static nodes closest to the partial protocol definition 924. As a technical advantage, the computational efficiency of the processors or servers of the application 402 is improved using a vector-to-vector comparison.

Figure 10:
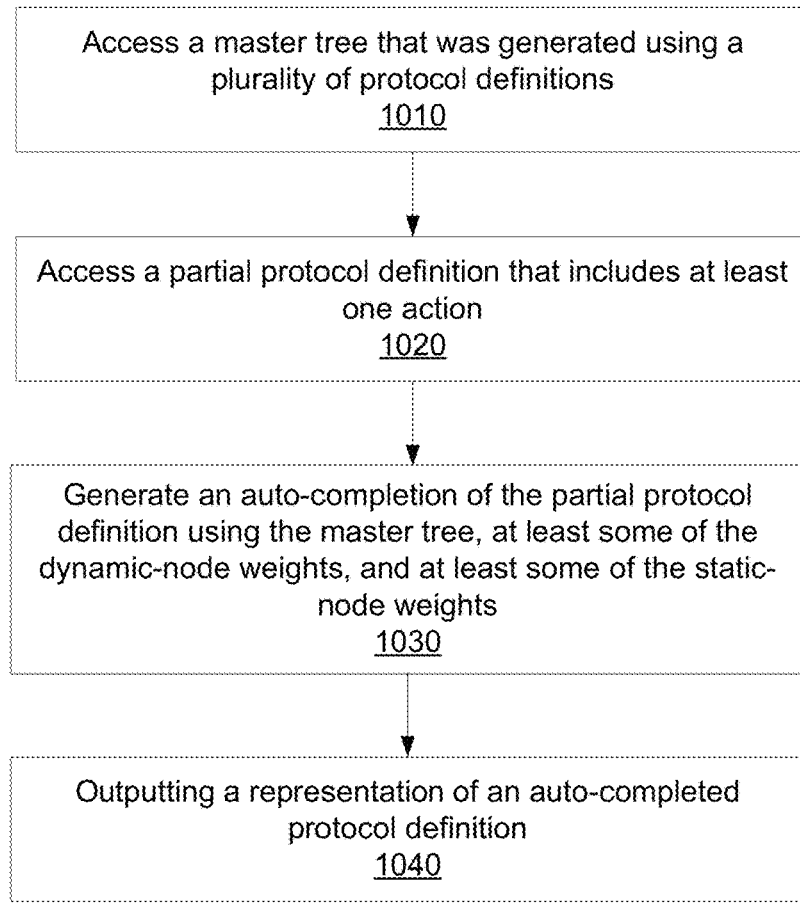
FIG. 10 illustrates a first flowchart illustrating an example of a process for auto-completing a partial protocol definition using a master tree, according to some aspects of the present disclosure.

FIG. 10 is a flowchart of an example process 1000 associated with auto-completing a partial protocol definition. In some implementations, one or more process blocks of FIG. 10 may be performed by a computing device (e.g., computing device 1500). In some implementations, one or more process blocks of FIG. 10 may be performed by another device or a group of devices separate from or including the computing device 1500. Additionally, or alternatively, one or more process blocks of FIG. 10 may be performed by one or more components of device 1500, such as processing subsystem 1504 (including one or more of processing unit 1532 and processing unit 1534), system memory 1510, computer readable storage media reader 1520, computer readable storage media 1522, input/output subsystem 1508, and/or bus 1502.

At block 1010, process 1000 may include accessing a master tree that was generated using a plurality of protocol definitions, wherein: each of the plurality of protocol definitions identifies an ordered set of actions and specifies, for each sequential pair of actions in the ordered set of actions, an action-advancement condition that identifies a criterion for advancing across the sequential pair of actions in the ordered set of actions so as to trigger a later of the sequential pair of actions. For example, the computing device may access a master tree that was generated using a plurality of protocol definitions, wherein, as described above.

At block 1020, process 1000 may include accessing a partial protocol definition that includes at least one action. For example, the computing device may access a partial protocol definition that includes at least one action, as described above.

At block 1030, process 1000 may include generating an auto-completion of the partial protocol definition using the master tree, at least some of the dynamic-node weights, and at least some of the static-node weights. For example, the computing device may generate an auto-completion of the partial protocol definition using the master tree, at least some of the dynamic-node weights, and at least some of the static-node weights, as described above.

At block 1040, process 1000 may include outputting a representation of an auto-completed protocol definition. For example, the computing device may output a representation of an auto-completed protocol definition, as described above.

Process 1000 may include additional implementations, such as any single implementation or any combination of implementations described below and/or in connection with one or more other processes described elsewhere herein.

Figure 11:
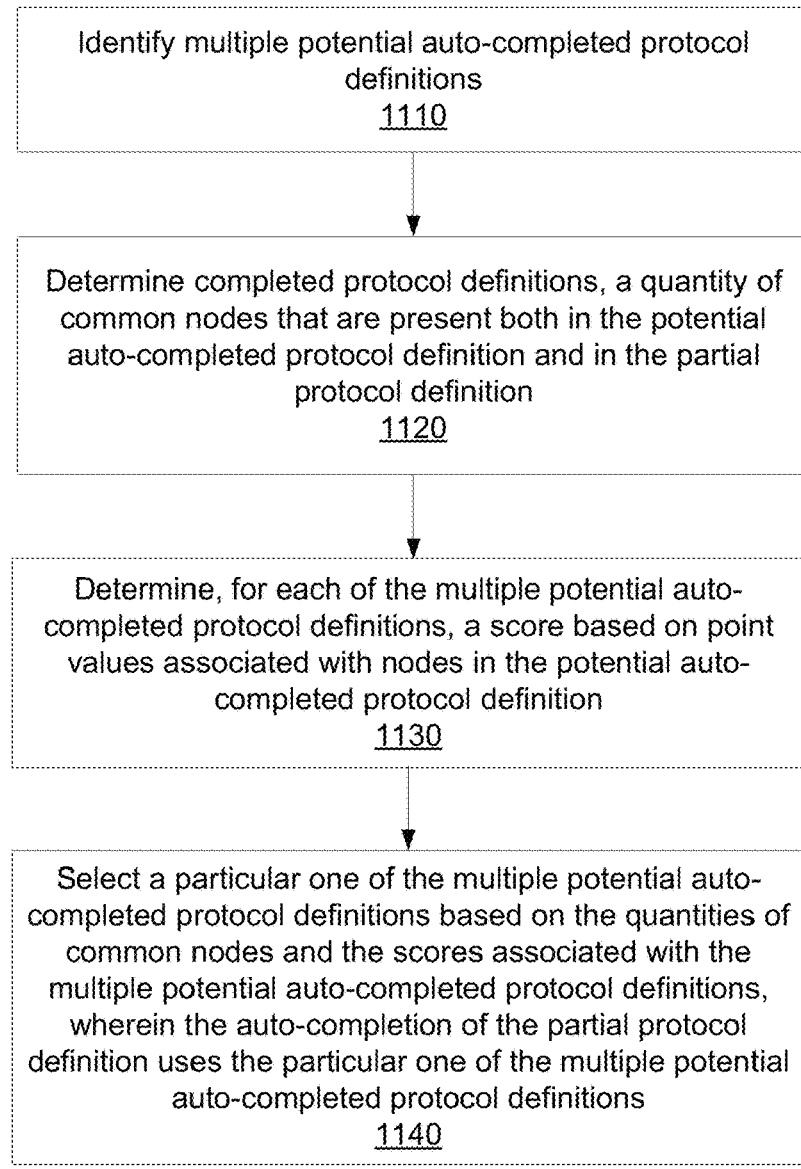
FIG. 11 illustrates a second flowchart illustrating an example of a process for auto-completing a partial protocol definition using a master tree using a machine learning process, according to some aspects of the present disclosure.

FIG. 11 is a flowchart of an example process 1100 associated with auto-completing a partial protocol definition. In some implementations, one or more process blocks of FIG. 11 may be performed by a computing device (e.g., computing device 1500). In some implementations, one or more process blocks of FIG. 11 may be performed by another device or a group of devices separate from or including the computing device 1500. Additionally, or alternatively, one or more process blocks of FIG. 11 may be performed by one or more components of device 1500, such as processing subsystem 1504 (including one or more of processing unit 1532 and processing unit 1534), system memory 1510, computer readable storage media reader 1520, computer readable storage media 1522, input/output subsystem 1508, and/or bus 1502.

At block 1110, process 1100 can include generating the auto-completion of the partial protocol definition includes identifying multiple potential auto-completed protocol definitions.

At block 1120, process 1100 can include determining, for each of the multiple potential auto-completed protocol definitions, a quantity of common nodes that are present both in the potential auto-completed protocol definition and in the partial protocol definition.

At block 1130, process 1100 can include determining, for each of the multiple potential auto-completed protocol definitions, a score based on point values associated with nodes in the potential auto-completed protocol definition.

At block 1140 process 1100 can include selecting a particular one of the multiple potential auto-completed protocol definitions based on the quantities of common nodes and the scores associated with the multiple potential auto-completed protocol definitions. In various implementations, the auto-completion of the partial protocol definition can use the particular one of the multiple potential auto-completed protocol definitions.

Figure 12:
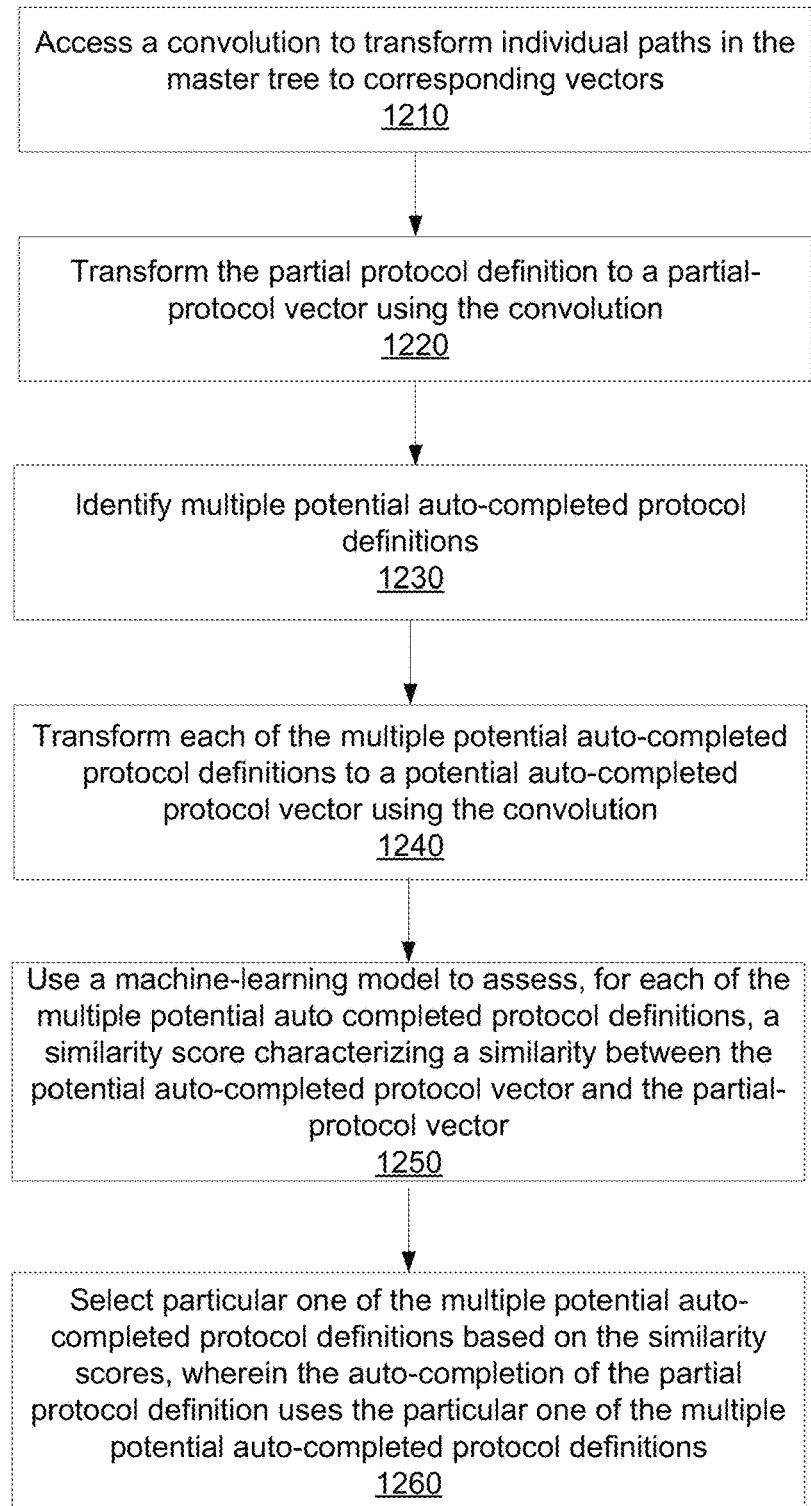
FIG. 12 illustrates a third flowchart illustrating an example of a process for auto-completing a partial protocol definition using a master tree using a vector analysis process, according to some aspects of the present disclosure.

FIG. 12 is a flowchart of an example process 1200 associated with auto-completing a partial protocol definition. In some implementations, one or more process blocks of FIG. 6 may be performed by a computing device (e.g., computing device 1500). In some implementations, one or more process blocks of FIG. 12 may be performed by another device or a group of devices separate from or including the computing device 1500. Additionally, or alternatively, one or more process blocks of FIG. 12 may be performed by one or more components of device 1500, such as processing subsystem 1504 (including one or more of processing unit 1532 and processing unit 1534), system memory 1510, computer readable storage media reader 1520, computer readable storage media 1522, input/output subsystem 1508, and/or bus 1502.

At block 1210, process 1200 can include generating the auto-completion of the partial protocol definition includes accessing a convolution to transform individual paths in the master tree to corresponding vectors.

At block 1212, process 1200 can include transforming the partial protocol definition to a partial-protocol vector using the convolution, identifying multiple potential auto-completed protocol definitions.

At block 1214, process 1200 can include transforming each of the multiple potential auto-completed protocol definitions to a potential auto-completed protocol vector using the convolution.

At block 1216, process 1200 can include using a machine-learning model to assess, for each of the multiple potential auto completed protocol definitions, a similarity score characterizing a similarity between the potential auto-completed protocol vector and the partial-protocol vector.

At block 1218, process 1200 can include electing a particular one of the multiple potential auto-completed protocol definitions based on the similarity scores. The auto-completion of the partial protocol definition can use the particular one of the multiple potential auto-completed protocol definitions.

In a various implementations, the master tree comprises a union of individual protocol definitions.

In a various implementations, the master tree comprises a set of individual protocol definitions when individual protocol definitions are disjoint from each other.

In various implementations, the plurality of protocol definitions define marketing campaign programs.

In a various implementations, the set of dynamic nodes are associated with one or more performance measures.

Although FIGS. 10, 11, and 12 illustrate shows example blocks of processes 1000, 1100, and 1200 in some implementations, processes 1000, 1100, and 1200 can include additional blocks, fewer blocks, different blocks, or differently arranged blocks than those depicted in FIGS. 10, 11, and 12. Additionally, or alternatively, two or more of the blocks of processes 1000, 1100, and 1200 can be performed in parallel.

Figure 13:
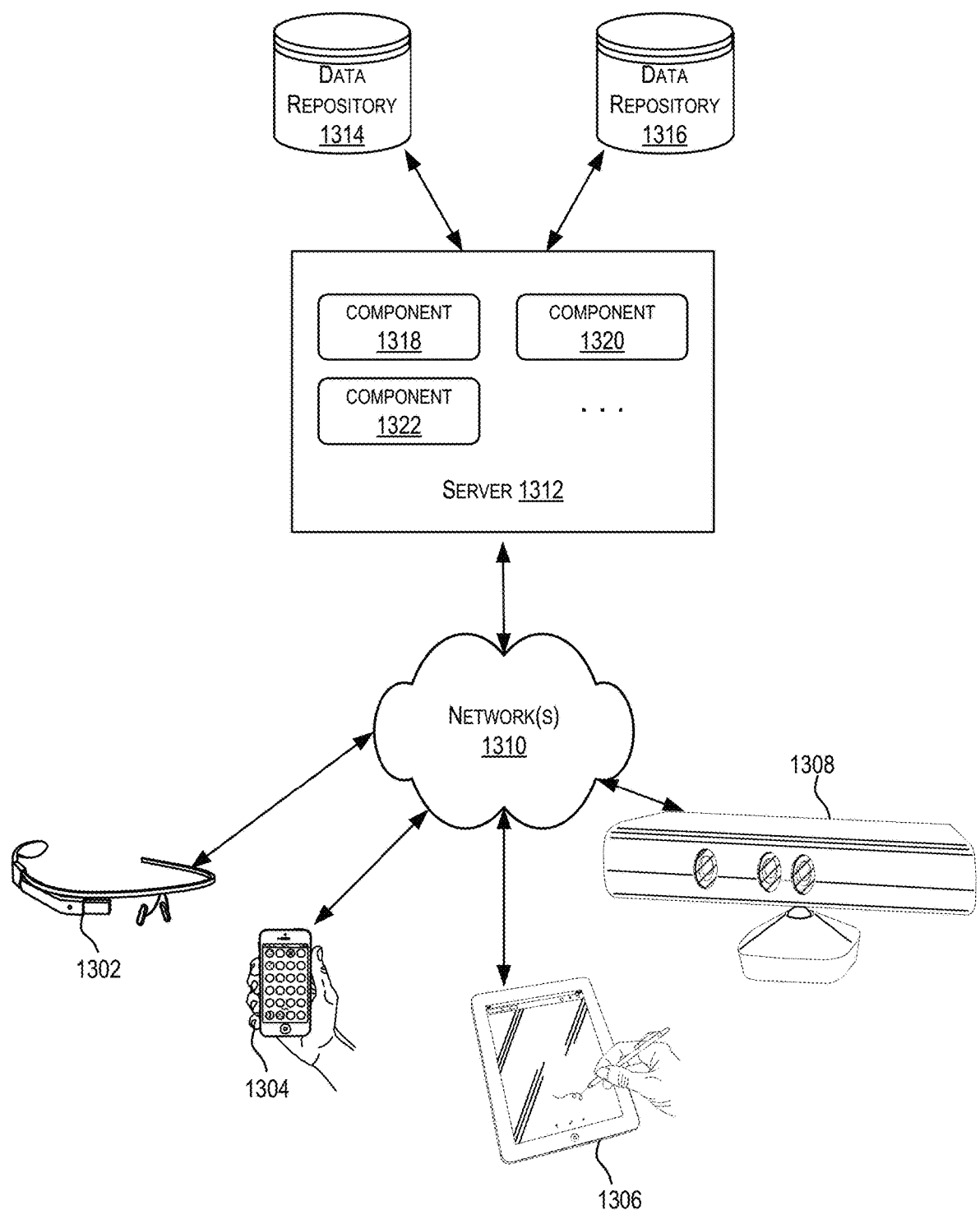
FIG. 13 illustrates a simplified diagram illustrating a distributed system for implementing one of the embodiments.

FIG. 13 depicts a simplified diagram of a distributed system 1300 for implementing one of the embodiments. In the illustrated embodiment, distributed system 1300 includes one or more client computing devices 1302, 1304, 1306, and 1308, which are configured to execute and operate a client application such as a web browser, proprietary client (e.g., Oracle Forms), or the like over one or more network(s) 1310. Server 1312 may be communicatively coupled with remote client computing devices 1302, 1304, 1306, and 1308 via network 1310.

In various embodiments, server 1312 may be adapted to run one or more services or software applications provided by one or more of the components of the system. In some embodiments, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in the figure, the software components 1318, 1320, and 1322 of system 1300 are shown as being implemented on server 1312. In other embodiments, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in the figure is thus one example of a distributed system for implementing an embodiment system and is not intended to be limiting.

Client computing devices 1302, 1304, 1306, and/or 1308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers, and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1302, 1304, 1306, and 1308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1310.

Although exemplary distributed system 1300 is shown with four client computing devices, any number of client computing devices may be supported. Other devices, such as devices with sensors, etc., may interact with server 1312.

Network(s) 1310 in distributed system 1300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), such as one based on Ethernet, Token-Ring and/or the like. Network(s) 1310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, server 1312 may correspond to a server for performing processing described above according to an embodiment of the present disclosure.

Server 1312 may run an operating system including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more databases 1314 and 1316. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of embodiments, databases 1314 and 1316 may reside in a storage-area network (SAN). Similarly, any necessary files for performing the functions attributed to server 1312 may be stored locally on server 1312 and/or remotely, as appropriate. In one set of embodiments, databases 1314 and 1316 may include relational databases, such as databases provided by Oracle, that are adapted to store, update, and retrieve data in response to SQL-formatted commands.

Figure 14:
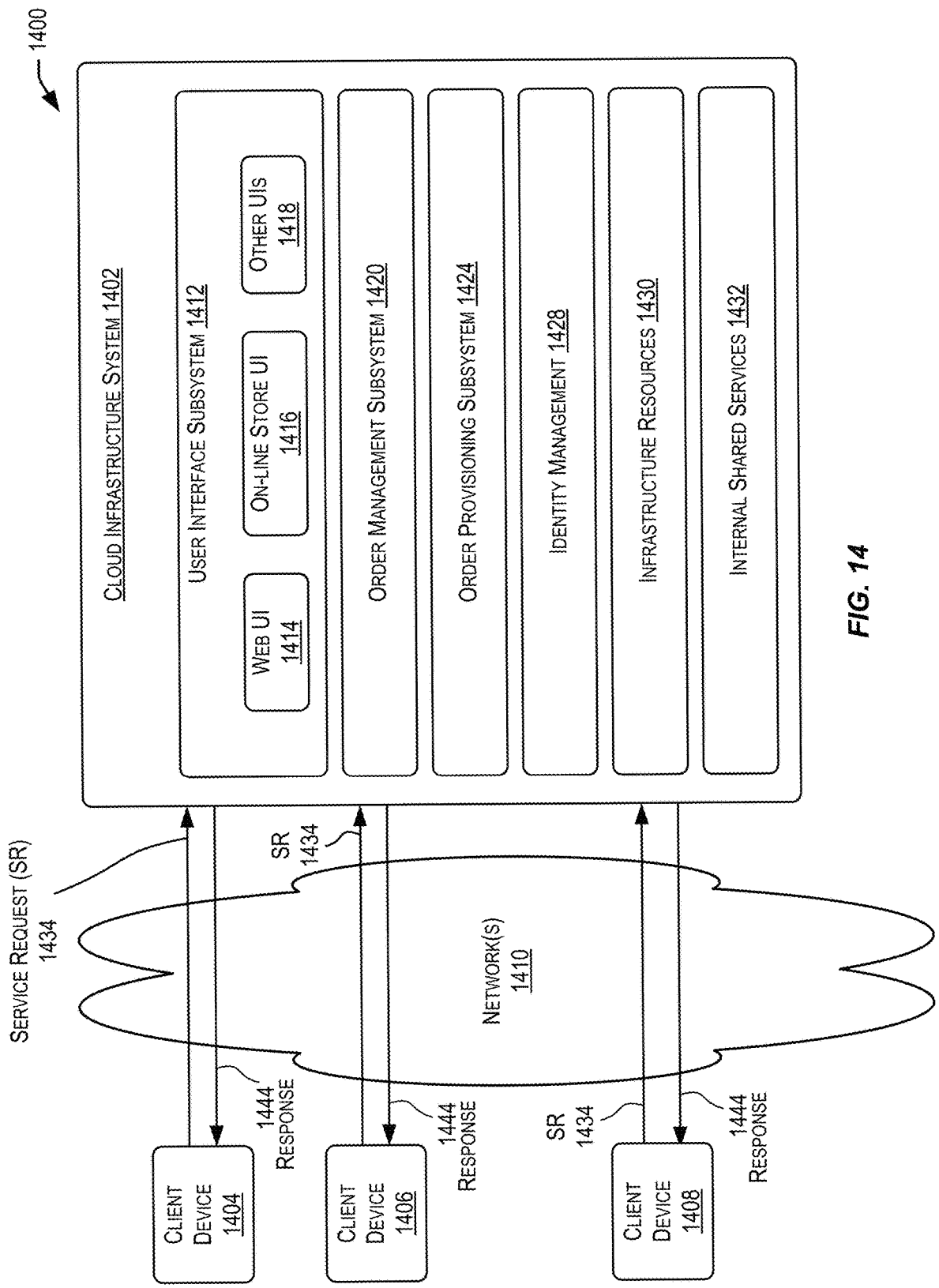
FIG. 14 illustrates a simplified block diagram illustrating one or more components of a system environment.

FIG. 14 is a simplified block diagram of one or more components of a system environment 1400 by which services provided by one or more components of an embodiment system may be offered as cloud services, in accordance with an embodiment of the present disclosure. In the illustrated embodiment, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in the figure may have other components than those depicted. Further, the embodiment shown in the figure is only one example of a cloud infrastructure system that may incorporate an embodiment of the invention. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308.

Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network familiar to those skilled in the art that can support data communications using any of a variety of commercially-available protocols, including those described above for network(s) 1310.

Cloud infrastructure system 1402 may comprise one or more computers and/or servers that may include those described above for server 1312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1402 may be adapted to automatically provision, manage, and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform.

In some embodiments, resources in cloud infrastructure system 1402 may be shared by multiple users and dynamically re-allocated per demand. Additionally, resources may be allocated to users in different time zones. For example, cloud infrastructure system 1430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1402, and the like.

In one embodiment, as depicted in the figure, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In exemplary operation 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

After an order has been placed by the customer, the order information is received via the cloud UIs, 1412, 1414, and/or 1416.

At operation 1436, the order is stored in order database 1418. Order database 1418 can be one of several databases operated by cloud infrastructure system 1418 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain embodiments, order orchestration module 1422 enables the management of processes associated with each order and applies logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client devices 1404, 1406, and/or 1408 by order provisioning module 1424 of cloud infrastructure system 1402.

At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain embodiments, cloud infrastructure system 1400 may include an identity management module 1428. Identity management module 1428 may be configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

Figure 15:
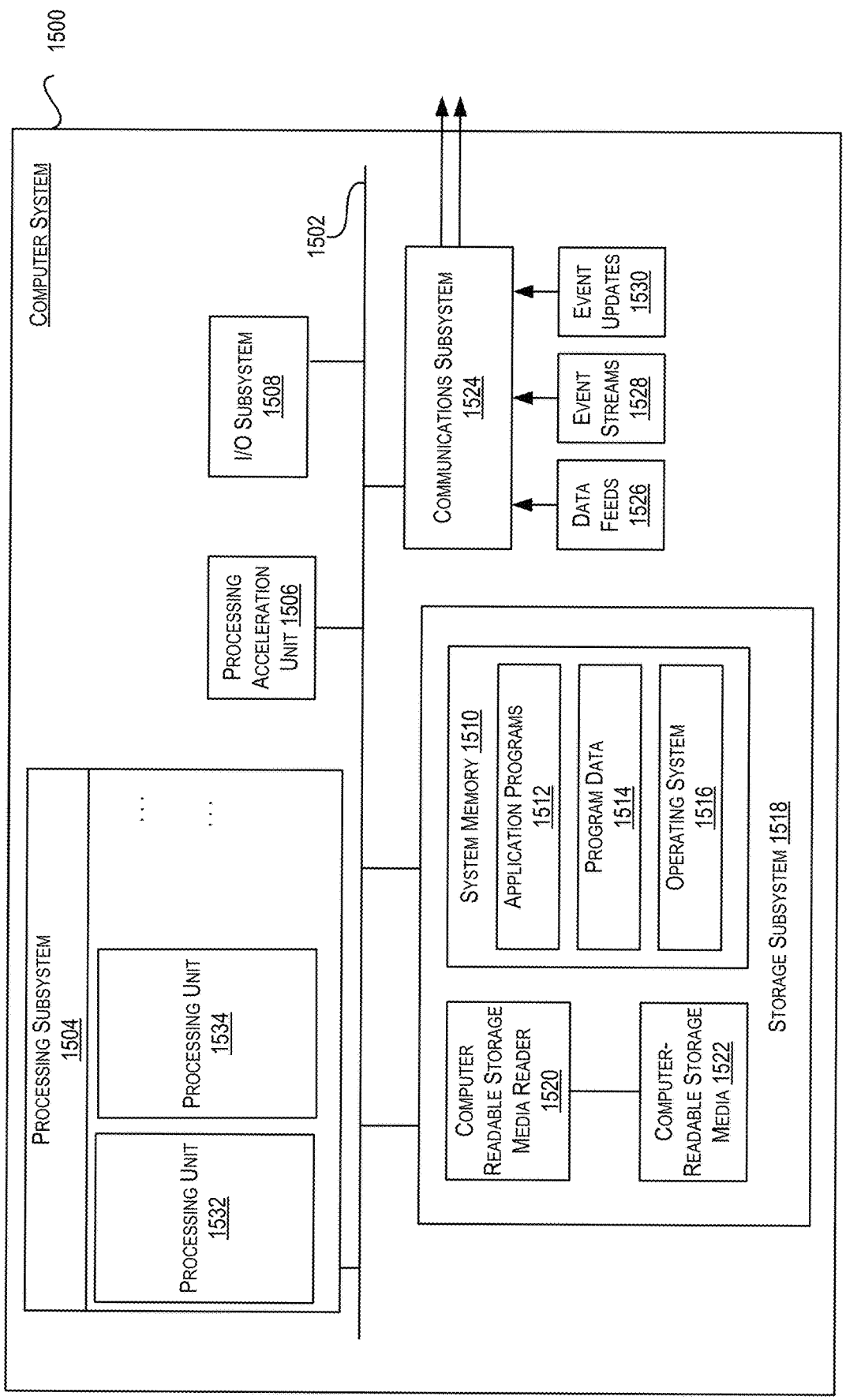
FIG. 15 illustrates an exemplary computer system, in which various embodiments of the present invention may be implemented.

FIG. 15 illustrates an exemplary computer system 1500, in which various embodiments of the present invention may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518, and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present invention.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 1202.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530 that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
accessing one or more master trees, generated using a plurality of protocol definitions, that defines conditions for transmission of a plurality of dataset to a plurality of computing devices, wherein:
each of the plurality of protocol definitions identifies an ordered set of actions, for each sequential pair of actions in the ordered set of actions, an action-advancement condition that identifies a criterion for advancing across the sequential pair of actions in the ordered set of actions so as to trigger a later of the sequential pair of actions;
each of the plurality of protocol definitions respectively include a set of dynamic nodes and a set of static nodes;
each of the set of dynamic nodes represents an action that was identified in at least one of the plurality of protocol definitions;
each of the set of static nodes represents an action-advancement condition specified in at least one of the plurality of protocol definitions;
the master trees are configured such that, for each of the plurality of protocol definitions, a path through a subset of the set of static nodes and through a subset of the set of dynamic nodes represents the protocol definition;
each of the set of dynamic nodes has a dynamic-node weight that was defined based on data indicating a past result of performing a dynamic action represented by the dynamic node;
each of the set of static nodes has a static-node weight that was defined based on a backpropagation of at least one of the dynamic-node weights; and
each of at least some of the dynamic nodes and each of at least some of the static nodes is associated with a point value generated based at least on the data indicating a past result of performing an action represented by a node;
accessing a partial protocol definition that includes at least one action, wherein the partial protocol definition comprises a mapping of an ordered set of actions to a partial tree comprising an incomplete path or incomplete set of paths that includes one or more identified dynamic nodes and that includes one or more identified static nodes, wherein the partial protocol definition is generated using a plurality of icons in a graphical user interface (GUI);
generating a complete protocol definition by an auto-completion of the partial protocol definition using a comparison of the partial protocol definition with the plurality of protocol definitions associated with the one or more master trees, at least some of the dynamic-node weights, and at least some of the static-node weights, wherein:
the comparison is performed by computing a score based on point values associated with nodes and/or a similarity score using a machine learning model to select a protocol definition of the plurality of protocol definitions to auto-complete the partial protocol definition;
determining, based on the ordered set of actions and the action-advancement condition associated with the complete protocol definition, a subset of dataset from the plurality of dataset to be transmitted to a computing device of the plurality of computing devices; and
transmitting the subset of dataset to the computing device.

2. The computer-implemented method of claim 1, wherein the generating the auto-completion of the partial protocol definition includes:
identifying multiple potential auto-completed protocol definitions from the comparison with the one or more master trees;
determining, for each of the multiple potential auto-completed protocol definitions, a quantity of common nodes that are present both in the potential auto-completed protocol definition and in the partial protocol definition;
determining, for each of the multiple potential auto-completed protocol definitions, the score based on the point values associated with nodes in the potential auto-completed protocol definition, wherein the score comprises a weighted sum of the point values and the point values associated with the nodes are based on the data indicating a past result of performing an action represented by a node; and
selecting a particular one of the multiple potential auto-completed protocol definitions based on the quantities of common nodes and the scores associated with the multiple potential auto-completed protocol definitions, wherein the auto-completion of the partial protocol definition uses the particular one of the multiple potential auto-completed protocol definitions.

3. The computer-implemented method of claim 1, wherein generating the auto-completion of the partial protocol definition includes:
accessing a convolution to transform individual paths in the one or more master trees to corresponding vectors;
transforming the partial protocol definition to a partial-protocol vector using the convolution;
identifying multiple potential auto-completed protocol definitions;
transforming each of the multiple potential auto-completed protocol definitions to a potential auto-completed protocol vector using the convolution;
using a machine learning model to assess, for each of the multiple potential auto-completed protocol definitions, the similarity score characterizing a similarity between the potential auto-completed protocol vector and the partial-protocol vector; and
selecting a particular one of the multiple potential auto-completed protocol definitions based on the similarity scores, wherein the auto-completion of the partial protocol definition uses the particular one of the multiple potential auto-completed protocol definitions.

4. The computer-implemented method of claim 1, wherein at least one of the one or more master trees comprises a union of individual protocol definitions.

5. The computer-implemented method of claim 1, wherein at least one of the one or more master trees comprises a set of individual protocol definitions in which individual protocol definitions are disjoint from each other.

6. The computer-implemented method of claim 1, wherein one of the identified actions includes transmitting the subset of dataset that includes one or more contents in response to a request from the computing device.

7. The computer-implemented method of claim 1, wherein the set of static and dynamic nodes are associated with one or more performance measures, wherein the one or more performance measures comprise a weighted sum of the point values and the point values associated with the nodes are based on the data indicating a past result of performing an action represented by a node.

8. A non-transitory computer-readable medium comprising:
a set of instructions stored on the non-transitory computer-readable medium, the set of instructions comprising one or more instructions that, when executed by one or more processors of a computing device, result in performance of the following method:
accessing one or more master trees, generated using a plurality of protocol definitions, that defines conditions for transmission of a plurality of dataset to a plurality of computing devices, wherein:
each of the plurality of protocol definitions identifies an ordered set of actions, for each sequential pair of actions in the ordered set of actions, an action-advancement condition that identifies a criterion for advancing across the sequential pair of actions in the ordered set of actions so as to trigger a later of the sequential pair of actions;
each of the plurality of protocol definitions respectively include a set of dynamic nodes and a set of static nodes;
each of the set of dynamic nodes represents an action that was identified in at least one of the plurality of protocol definitions;
each of the set of static nodes represents an action-advancement condition specified in at least one of the plurality of protocol definitions;
the master trees are configured such that, for each of the plurality of protocol definitions, a path through a subset of the set of static nodes and through a subset of the set of dynamic nodes represents the protocol definition;
each of the set of dynamic nodes has a dynamic-node weight that was defined based on data indicating a past result of performing a dynamic action represented by the dynamic node;
each of the set of static nodes has a static-node weight that was defined based on a backpropagation of at least one of the dynamic-node weights; and
each of at least some of the dynamic nodes and each of at least some of the static nodes is associated with a point value generated based at least on the data indicating a past result of performing an action represented by a node;
accessing a partial protocol definition that includes at least one action, wherein the partial protocol definition comprises a mapping of an ordered set of actions to a partial tree comprising an incomplete path or incomplete set of paths that includes one or more identified dynamic nodes and that includes one or more identified static nodes, wherein the partial protocol definition is generated using a plurality of icons in a graphical user interface (GUI);
generating a complete protocol definition by an auto-completion of the partial protocol definition using a comparison of the partial protocol definition with the plurality of protocol definitions associated with the one or more master trees, at least some of the dynamic-node weights, and at least some of the static-node weights, wherein:
the comparison is performed by computing a score based on point values associated with nodes and/or a similarity score using a machine learning model to select a protocol definition of the plurality of protocol definitions to auto-complete the partial protocol definition;
determining, based on the ordered set of actions and the action-advancement condition associated with the complete protocol definition, a subset of dataset from the plurality of dataset to be transmitted to a computing device of the plurality of computing devices; and
transmitting the subset of dataset to the computing device.

9. The non-transitory computer-readable medium of claim 8, wherein the one or more instructions, that execution thereof results in the generating the auto-completion of the partial protocol definition, further results in the generating the auto-completion of the partial protocol definition comprising:
identifying multiple potential auto-completed protocol definitions from the comparison with the one or more master trees;
determining, for each of the multiple potential auto-completed protocol definitions, a quantity of common nodes that are present both in the potential auto-completed protocol definition and in the partial protocol definition;
determining, for each of the multiple potential auto-completed protocol definitions, the score based on the point values associated with nodes in the potential auto-completed protocol definition, wherein the score comprises a weighted sum of the point values and the point values associated with the nodes are based at least on the data indicating a past result of performing an action represented by a node; and
selecting a particular one of the multiple potential auto-completed protocol definitions based on the quantities of common nodes and the scores associated with the multiple potential auto-completed protocol definitions, wherein the auto-completion of the partial protocol definition uses the particular one of the multiple potential auto-completed protocol definitions.

10. The non-transitory computer-readable medium of claim 8, wherein the one or more instructions, that execution thereof results in the generating the auto-completion of the partial protocol definition, further results in the generating the auto-completion of the partial protocol definition comprising:
accessing a convolution to transform individual paths in the one or more master trees to corresponding vectors;
transforming the partial protocol definition to a partial-protocol vector using the convolution;
identifying multiple potential auto-completed protocol definitions;
transforming each of the multiple potential auto-completed protocol definitions to a potential auto-completed protocol vector using the convolution;
using a machine learning model to assess, for each of the multiple potential auto-completed protocol definitions, the similarity score characterizing a similarity between the potential auto-completed protocol vector and the partial-protocol vector; and selecting a particular one of the multiple potential auto-completed protocol definitions based on the similarity scores, wherein the auto-completion of the partial protocol definition uses the particular one of the multiple potential auto-completed protocol definitions.

11. The non-transitory computer-readable medium of claim 8, wherein at least one of the one or more master trees comprises a union of individual protocol definitions.

12. The non-transitory computer-readable medium of claim 8, wherein at least one of the one or more master trees comprises a set of individual protocol definitions in which individual protocol definitions are disjoint from each other.

13. The non-transitory computer-readable medium of claim 8, wherein one of the identified actions include transmitting the subset of dataset that includes one or more contents in response to a request from the computing device.

14. The non-transitory computer-readable medium of claim 8, wherein the set of static and dynamic nodes are associated with one or more performance measures, wherein the one or more performance measures comprise a weighted sum of the point values, and wherein the point values associated with the nodes are based at least on the data indicating a past result of performing an action represented by a node.

15. A computing device, comprising:
one or more memories including one or more executable instructions stored thereon; and
one or more processors, communicatively coupled to the one or more memories, so that execution by the one or more processors of the one or more executable instructions results in performance of the following method:
accessing one or more master trees, generated using a plurality of protocol definitions, that defines conditions for transmission of a plurality of dataset to a plurality of computing devices, wherein:
each of the plurality of protocol definitions identifies an ordered set of actions, for each sequential pair of actions in the ordered set of actions, an action-advancement condition that identifies a criterion for advancing across the sequential pair of actions in the ordered set of actions so as to trigger a later of the sequential pair of actions;
each of the plurality of protocol definitions respectively include a set of dynamic nodes and a set of static nodes;
each of the set of dynamic nodes represents an action that was identified in at least one of the plurality of protocol definitions;
each of the set of static nodes represents an action-advancement condition specified in at least one of the plurality of protocol definitions;
the master trees are configured such that, for each of the plurality of protocol definitions, a path through a subset of the set of static nodes and through a subset of the set of dynamic nodes represents the protocol definition;
each of the set of dynamic nodes has a dynamic-node weight that was defined based on data indicating a past result of performing a dynamic action represented by the dynamic node;
each of the set of static nodes has a static-node weight that was defined based on a backpropagation of at least one of the dynamic-node weights; and
each of at least some of the dynamic nodes and each of at least some of the static nodes is associated with a point value generated based at least on the data indicating a past result of performing an action represented by a node;
accessing a partial protocol definition that includes at least one action, wherein the partial protocol definition comprises a mapping of an ordered set of actions to a partial tree comprising an incomplete path or incomplete set of paths that includes one or more identified dynamic nodes and that includes one or more identified static nodes, wherein the partial protocol definition is generated using a plurality of icons in a graphical user interface (GUI);
generating a complete protocol definition by an auto-completion of the partial protocol definition using a comparison of the partial protocol definition with the plurality of protocol definitions associated with the one or more master trees, at least some of the dynamic-node weights, and at least some of the static-node weights, wherein:
the comparison is performed by computing a score based on point values associated with nodes and/or a similarity score using a machine learning model to select a protocol definition of the plurality of protocol definitions to auto-complete the partial protocol definition;
determining, based on the ordered set of actions and the action-advancement condition associated with the complete protocol definition, a subset of dataset from the plurality of dataset to be transmitted to a computing device of the plurality of computing devices; and
transmitting the subset of dataset to the computing device.

16. The computing device of claim 15, wherein the one or more instructions, execution thereof that results in the generating the auto-completion of the partial protocol definition, further results in the generating the auto-completion of the partial protocol definition comprising:
identifying multiple potential auto-completed protocol definitions from the comparison with the one or more master trees;
determining, for each of the multiple potential auto-completed protocol definitions, a quantity of common nodes that are present both in the potential auto-completed protocol definition and in the partial protocol definition;
determining, for each of the multiple potential auto-completed protocol definitions, the score based on the point values associated with nodes in the potential auto-completed protocol definition, wherein the score comprises a weighted sum of s and the point values associated with the nodes are based at least on the data indicating a past result of performing an action represented by a node; and
selecting a particular one of the multiple potential auto-completed protocol definitions based on the quantities of common nodes and the scores associated with the multiple potential auto-completed protocol definitions, wherein the auto-completion of the partial protocol definition uses the particular one of the multiple potential auto-completed protocol definitions.

17. The computing device of claim 15, wherein the one or more instructions, execution thereof that results in generating the auto-completion of the partial protocol definition, further results in the generating the auto-completion of the partial protocol definition comprising:
accessing a convolution to transform individual paths in the one or more master trees to corresponding vectors;

transforming the partial protocol definition to a partial-protocol vector using the convolution;

identifying multiple potential auto-completed protocol definitions;

transforming each of the multiple potential auto-completed protocol definitions to a potential auto-completed protocol vector using the convolution;

using a machine learning model to assess, for each of the multiple potential auto-completed protocol definitions, the similarity score characterizing a similarity between the potential auto-completed protocol vector and the partial-protocol vector; and selecting a particular one of the multiple potential auto-completed protocol definitions based on the similarity scores, wherein the auto-completion of the partial protocol definition uses the particular one of the multiple potential auto-completed protocol definitions.

18. The computing device of claim 15, wherein at least one of the one or more master trees comprises a union of individual protocol definitions.

19. The computing device of claim 15, wherein at least one of the one or more master trees comprises a set of individual protocol definitions in which individual protocol definitions are disjoint from each other.

20. The computing device of claim 15, wherein one of the identified actions includes transmitting the subset of dataset that includes one or more contents in response to a request from the computing device.

* * * * *